US012231654B2

(12) United States Patent
Hong et al.

(10) Patent No.: US 12,231,654 B2
(45) Date of Patent: Feb. 18, 2025

(54) HISTORY-BASED MOTION VECTOR PREDICTION AND MODE SELECTION FOR GRADUAL DECODING REFRESH

(71) Applicant: Nokia Technologies Oy, Espoo (FI)

(72) Inventors: Seungwook Hong, San Diego, CA (US); Limin Wang, San Diego, CA (US); Krit Panusopone, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 135 days.

(21) Appl. No.: 18/246,257

(22) PCT Filed: Sep. 2, 2021

(86) PCT No.: PCT/EP2021/074206
§ 371 (c)(1),
(2) Date: Mar. 22, 2023

(87) PCT Pub. No.: WO2022/063538
PCT Pub. Date: Mar. 31, 2022

(65) Prior Publication Data
US 2023/0362390 A1 Nov. 9, 2023

Related U.S. Application Data

(60) Provisional application No. 63/084,360, filed on Sep. 28, 2020.

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/176* (2014.11); *H04N 19/52* (2014.11)

(58) Field of Classification Search
None
See application file for complete search history.

(56) References Cited

U.S. PATENT DOCUMENTS

| | | | |
|---|---|---|---|
| 2021/0014529 A1* | 1/2021 | Coban | H04N 19/174 |
| 2022/0060733 A1* | 2/2022 | Wang | H04N 19/176 |
| 2023/0120726 A1* | 4/2023 | Deng | H04N 19/1883 |
| | | | 375/240.26 |

FOREIGN PATENT DOCUMENTS

| | | |
|---|---|---|
| WO | 2020/188149 A1 | 9/2020 |
| WO | 2021/001600 A1 | 1/2021 |

(Continued)

OTHER PUBLICATIONS

"Versatile Video Coding", Series H: Audiovisual and Multimedia Systems Infrastructure of audiovisual services—Coding of moving video, Recommendation ITU-T H.266, Aug. 2020, 516 pages.

(Continued)

*Primary Examiner* — Stuart D Bennett
(74) *Attorney, Agent, or Firm* — Nokia Technologies Oy

(57) ABSTRACT

A method, apparatus, and computer program product provide for management of history-based motion vector prediction (HMVP) processes for Gradual Decoding Refresh (GDR) pictures, as well as efficient implementations of mode selection within a GDR period and tuning of coding tools such as in-loop filters and Luma Mapping with Chroma Scaling (LMCS) such that current coding units within a clean area avoid use of coding information within a dirty area of a picture. In the context of a method, the method accesses a current coding unit of a picture. The method also accesses information associated with coding unit references each associated with a respective inter-coded coding unit. The method also determines at least one candidate coding unit reference based at least upon a comparison of an associated index value to a dirty index, and assigns at least (Continued)

one coding unit to a candidate list for selection in a coding process.

20 Claims, 21 Drawing Sheets

(51) Int. Cl.
  *H04N 19/176* (2014.01)
  *H04N 19/52* (2014.01)

(56) References Cited

FOREIGN PATENT DOCUMENTS

| WO | 2021/047817 A1 | 3/2021 |
| WO | 2021/190956 A1 | 9/2021 |
| WO | 2021/197862 A1 | 10/2021 |
| WO | 2021/204553 A1 | 10/2021 |
| WO | 2022/017747 A1 | 1/2022 |

OTHER PUBLICATIONS

Bross et al., "Versatile Video Coding (Draft 7)", Editors, Joint Video Experts Team (JVET) of ITU-T SG 16 WP 3 and ISO/IEC JTC1/SC29/WG11, JVET-P2001, Oct. 1-11, 2019, 492 pages.

Invitation to Pay Additional Fees received for corresponding Patent Cooperation Treaty Application No. PCT/EP2021/074206, dated Dec. 21, 2021, 12 pages.

Wang et al., "AHG9: Gradual Decoding Refresh for VVC", Nokia, Joint Video Experts Team (JVET) of ITU-T SG 16 WP 3 and ISO/IEC JTC1/SC29/WG11, JVET-Q0527, Jan. 7-17, 2020, pp. 1-6.

International Search Report and Written Opinion received for corresponding Patent Cooperation Treaty Application No. PCT/EP2021/074206, dated Mar. 14, 2022, 23 pages.

Hong et al., "GDR Software", Nokia, Joint Video Experts Team (JVET) of ITU-T SG 16 WP 3 and ISO/IEC JTC1/SC29, JVET-T0078, Oct. 7-16, 2020, 2 pages.

* cited by examiner

Merge Candidate List
1. Spatial MVP from spatial neighbour CUs
2. Temporal MVP from collocated CUs
3. History-based MVP from a FIFO table
   - Good candidates
4. Pairwise average MVP
5. Zero MVs

Figure 5A

Merge Candidate List
1. Spatial MVP from spatial neighbour CUs
2. Temporal MVP from collocated CUs
3. History-based MVP from a FIFO table
   - Good candidates
   - Bad candidates
4. Pairwise average MVP
5. Zero MVs

Figure 5B

Merge Candidate List
1. Spatial MVP from spatial neighbour CUs
2. Temporal MVP from collocated CUs
3. History-based MVP from a FIFO table
   - Bad candidates
4. Pairwise average MVP
5. Zero MVs

Figure 5C

AMVP Candidate List
1. Spatial MVP from spatial neighbour CUs
2. Temporal MVP from collocated CUs
3. History-based MVP from a FIFO table
   - All good candidates
4. Zero MVs

Figure 5D

AMVP Candidate List
1. Spatial MVP from spatial neighbour CUs
2. Temporal MVP from collocated CUs
3. History-based MVP from a FIFO table
   - All bad candidates
4. Zero MVs

Figure 5E

HISTORY-BASED MOTION VECTOR PREDICTION AND MODE SELECTION FOR GRADUAL DECODING REFRESH

RELATED APPLICATION

This application was originally filed as PCT Application No. PCT/EP2021/074206, filed on Sep. 2, 2021, which claims priority from U.S. Provisional Application No. 63/084,360, filed on Sep. 28, 2020, each of which is incorporated herein by reference in its entirety.

TECHNOLOGICAL FIELD

An example embodiment relates generally to techniques in video coding, and, more particularly, to techniques for efficient management of history-based motion vector prediction processes.

BACKGROUND

Versatile Video Coding (VVC) is an international video coding standard under development by the Joint Video Experts Team (JVET). A successor to the High Efficiency Video Coding (HEVC) standard, VVC provides numerous new and improved coding tools for encoding and decoding video.

Gradual Decoding Refresh (GDR) alleviates delay issues with intra coded pictures. Instead of coding an intra picture at a random access point, GDR progressively refreshes pictures by spreading intra coded areas over several pictures.

BRIEF SUMMARY

In an embodiment, an apparatus is provided. The apparatus includes at least one processor and at least one memory including computer program code. The at least one memory and the computer program code are configured to, with the at least one processor, cause the apparatus to obtain a current coding unit of a picture, the picture comprising a plurality of coding units including the current coding unit. The at least one memory and the computer program code are also configured to, with the at least one processor, cause the apparatus to access information associated with the current coding unit, the information comprising an amount of coding unit references, each coding unit reference associated with a respective coding unit of the plurality of coding units that has previously undergone an inter coding operation. The at least one memory and the computer program code are also configured to, with the at least one processor, cause the apparatus to determine at least one candidate coding unit reference of the predefined amount of coding unit references based at least upon a comparison of an index value associated with the at least one candidate coding unit reference to a dirty index, the dirty index comprising an index value of a coding unit of the plurality of coding units last to have undergone an inter coding operation while within a dirty area of the picture. The at least one memory and the computer program code are also configured to, with the at least one processor, cause the apparatus to assign at least one coding unit associated with the at least one candidate coding unit reference to a candidate list for selection in a coding process for the current coding unit.

In some embodiments of the apparatus, the picture comprises a gradual decoding refresh picture. In some embodiments of the apparatus, the information comprises a History-Based Motion Vector Prediction (HMVP) table.

In some embodiments of the apparatus, the candidate list comprises a merge candidate list, and the at least one memory and the computer program code are further configured to, with the at least one processor, cause the apparatus to assign the at least one coding unit to the merge candidate list such that the at least one coding unit is listed after one or more Temporal Motion Vector Prediction (TMVP) candidate coding units.

In some embodiments of the apparatus, the at least one memory and the computer program code are further configured to, with the at least one processor, cause the apparatus to, in an instance in which one or more candidate coding unit references of the predefined amount of coding unit references comprises an index value less than the dirty index, prevent any candidate coding units listed after the at least one candidate coding unit in the candidate list from being selected for the coding process for the current coding unit.

In some embodiments of the apparatus, the candidate list comprises an Advanced Motion Vector Prediction (AMVP) candidate list, and the at least one memory and the computer program code are further configured to, with the at least one processor, cause the apparatus to assign the at least one coding unit to the AMVP candidate list such that the at least one coding unit is listed after one or more Temporal Motion Vector Prediction (TMVP) candidate coding units. In some embodiments of the apparatus, the candidate list comprises one of a merge candidate list or an Advanced Motion Vector Prediction (AMVP) candidate list.

In another embodiment, an apparatus is provided comprising means for obtaining a current coding unit of a picture, the picture comprising a plurality of coding units including the current coding unit. The apparatus also includes means for accessing information associated with the current coding unit, the information comprising a predefined amount of coding unit references, each coding unit reference associated with a respective coding unit of the plurality of coding units that has previously undergone an inter coding operation. The apparatus also includes means for determining at least one candidate coding unit reference of the predefined amount of coding unit references based at least upon a comparison of an index value associated with the at least one candidate coding unit reference to a dirty index, the dirty index comprising an index value of a coding unit of the plurality of coding units last to have undergone an inter coding operation while within a dirty area of the picture. The apparatus also includes means for assigning at least one coding unit associated with the at least one candidate coding unit reference to a candidate list for selection in a coding process for the current coding unit.

In some embodiments of the apparatus, the picture comprises a gradual decoding refresh picture. In some embodiments of the apparatus, the information comprises a History-Based Motion Vector Prediction (HMVP) table. In some embodiments of the apparatus, the candidate list comprises a merge candidate list, and the apparatus further comprises means for assigning the at least one coding unit to the merge candidate list such that the at least one coding unit is listed after one or more Temporal Motion Vector Prediction (TMVP) candidate coding units.

In some embodiments, the apparatus further comprises, in an instance in which one or more candidate coding unit references of the predefined amount of coding unit references comprises an index value less than the dirty index, means for preventing any candidate coding units listed after the at least one candidate coding unit in the candidate list from being selected for the coding process for the current coding unit.

In some embodiments of the apparatus, the candidate list comprises an Advanced Motion Vector Prediction (AMVP) candidate list, and the apparatus further comprises means for assigning the at least one coding unit to the AMVP candidate list such that the at least one coding unit is listed after one or more Temporal Motion Vector Prediction (TMVP) candidate coding units. In some embodiments of the apparatus, the candidate list comprises one of a merge candidate list or an Advanced Motion Vector Prediction (AMVP) candidate list.

In another embodiment, a method is provided. The method comprises obtaining a current coding unit of a picture, the picture comprising a plurality of coding units including the current coding unit. The method also comprises accessing information associated with the current coding unit, the information comprising an amount of coding unit references, each coding unit reference associated with a respective coding unit of the plurality of coding units that has previously undergone an inter coding operation. The method also comprises determining at least one candidate coding unit reference of the predefined amount of coding unit references based at least upon a comparison of an index value associated with the at least one candidate coding unit reference to a dirty index, the dirty index comprising an index value of a coding unit of the plurality of coding units last to have undergone an inter coding operation while within a dirty area of the picture. The method also comprises assigning at least one coding unit associated with the at least one candidate coding unit reference to a candidate list for selection in a coding process for the current coding unit.

In some embodiments of the method, the picture comprises a gradual decoding refresh picture. In some embodiments of the method, the information comprises a History-Based Motion Vector Prediction (HMVP) table. In some embodiments of the method, the candidate list comprises a merge candidate list, and the method further comprises assigning the at least one coding unit to the merge candidate list such that the at least one coding unit is listed after one or more Temporal Motion Vector Prediction (TMVP) candidate coding units.

In some embodiments of the method, the method further comprises, in an instance in which one or more candidate coding unit references of the predefined amount of coding unit references comprises an index value less than the dirty index, preventing any candidate coding units listed after the at least one candidate coding unit in the candidate list from being selected for the coding process for the current coding unit.

In some embodiments of the method, the candidate list comprises an Advanced Motion Vector Prediction (AMVP) candidate list, and the method further comprises assigning the at least one coding unit to the AMVP candidate list such that the at least one coding unit is listed after one or more Temporal Motion Vector Prediction (TMVP) candidate coding units. In some embodiments of the method, the candidate list comprises one of a merge candidate list or an Advanced Motion Vector Prediction (AMVP) candidate list.

In another embodiment, a computer program product is provided that comprises a non-transitory computer readable storage medium having program code portions stored thereon, the program code portions configured, upon execution, to obtain a current coding unit of a picture, the picture comprising a plurality of coding units including the current coding unit. The program code portions are further configured, upon execution, to access information associated with the current coding unit, the information comprising a predefined amount of coding unit references, each coding unit reference associated with a respective coding unit of the plurality of coding units that has previously undergone an inter coding operation. The program code portions are further configured, upon execution, to determine at least one candidate coding unit reference of the predefined amount of coding unit references based at least upon a comparison of an index value associated with the at least one candidate coding unit reference to a dirty index, the dirty index comprising an index value of a coding unit of the plurality of coding units last to have undergone an inter coding operation while within a dirty area of the picture. The program code portions are further configured, upon execution, to assign at least one coding unit associated with the at least one candidate coding unit reference to a candidate list for selection in a coding process for the current coding unit.

In some embodiments of the computer program product, the picture comprises a gradual decoding refresh picture. In some embodiments of the computer program product, the information comprises a History-Based Motion Vector Prediction (HMVP) table.

In some embodiments of the computer program product, the candidate list comprises a merge candidate list, and the program code portions are further configured, upon execution, to assign the at least one coding unit to the merge candidate list such that the at least one coding unit is listed after one or more Temporal Motion Vector Prediction (TMVP) candidate coding units.

In some embodiments of the computer program product, the program code portions are further configured, upon execution, to, in an instance in which one or more candidate coding unit references of the predefined amount of coding unit references comprises an index value less than the dirty index, prevent any candidate coding units listed after the at least one candidate coding unit in the candidate list from being selected for the coding process for the current coding unit.

In some embodiments of the computer program product, the candidate list comprises an Advanced Motion Vector Prediction (AMVP) candidate list, and the program code portions are further configured, upon execution, to assign the at least one coding unit to the AMVP candidate list such that the at least one coding unit is listed after one or more Temporal Motion Vector Prediction (TMVP) candidate coding units. In some embodiments of the computer program product, the candidate list comprises one of a merge candidate list or an Advanced Motion Vector Prediction (AMVP) candidate list.

In another embodiment, an apparatus is provided. The apparatus comprises at least one processor and at least one memory including computer program code. The at least one memory and the computer program code are configured to, with the at least one processor, cause the apparatus to obtain a current coding unit of a picture, the picture comprising a plurality of coding units including the current coding unit. The at least one memory and the computer program code are further configured to, with the at least one processor, cause the apparatus to, based at least on the current coding unit, determine a validity status for at least a portion of a plurality of coding modes, the validity status comprising one of a valid status or an invalid status. The at least one memory and the computer program code are further configured to, with the at least one processor, cause the apparatus to determine a coding cost for at least a portion of the plurality of coding modes. The at least one memory and the computer program code are further configured to, with the at least one processor, cause the apparatus to assign a selected coding mode to the current coding unit based at least one of the validity status or the coding cost of the selected coding mode.

In some embodiments, of the apparatus, determining the validity status for at least the portion of the plurality of coding modes comprises determining the validity status for each of the plurality of coding modes, determining the coding cost for at least the portion of the plurality of coding modes comprises determining the coding cost for each coding mode of the plurality of coding modes associated with a valid status, and the selected coding mode is determined based on a comparison of coding costs for the each coding mode of the plurality of coding modes associated with a valid status.

In some embodiments of the apparatus, determining the coding cost for at least the portion of the plurality of coding modes comprises determining the coding cost for each coding mode of the plurality of coding modes, and the selected coding mode is determined based on based on the selected coding mode having a lowest coding cost while also having a valid status.

In some embodiments of the apparatus, each coding mode of the plurality of coding modes is associated with a respective coding mode subgroup, determining the validity status for at least the portion of the plurality of coding modes comprises determining the validity status for each of the plurality of coding modes, determining the coding cost for at least the portion of the plurality of coding modes comprises determining the coding cost for each coding mode of the plurality of coding modes associated with a valid status, and the at least one memory and the computer program code are further configured to, with the at least one processor, cause the apparatus to determine, for each coding mode subgroup, a respective candidate coding mode having a lowest coding cost of the coding costs of the coding modes associated with the coding mode subgroup, the selected coding mode being determined based on a comparison of coding costs for each of the candidate coding modes.

In some embodiments of the apparatus, each coding mode of the plurality of coding modes is associated with a respective coding mode subgroup, determining the coding cost for at least the portion of the plurality of coding modes comprises determining the coding cost for each coding mode of the plurality of coding modes, and the at least one memory and the computer program code are further configured to, with the at least one processor, cause the apparatus to determine, for each coding mode subgroup, a respective candidate coding mode having a lowest coding cost of the coding costs of the coding modes associated with the coding mode subgroup while also having a valid status, the selected coding mode being determined based on a comparison of coding costs for each of the candidate coding modes.

In some embodiments of the apparatus, each coding mode of the plurality of coding modes is associated with a respective coding mode subgroup, determining the coding cost for at least the portion of the plurality of coding modes comprises determining the coding cost for each coding mode of the plurality of coding modes, and the at least one memory and the computer program code are further configured to, with the at least one processor, cause the apparatus to determine, for each coding mode subgroup, a respective candidate coding mode having a lowest coding cost of the coding costs of the coding modes associated with the coding mode subgroup, wherein determining the validity status for at least the portion of the plurality of coding modes comprises determining a validity status for each candidate coding mode, and the selected coding mode is selected based on having a lowest coding cost of the coding costs associated with the candidate coding modes determined to have a valid status.

In some embodiments of the apparatus, determining the coding cost for at least the portion of the plurality of coding modes comprises determining the coding cost for each coding mode of the plurality of coding modes, the selected coding mode is determined based on the selected coding mode having the lowest coding cost of the coding costs determined for the plurality of coding modes, determining the validity status for at least the portion of the plurality of coding modes comprises determining the validity status for the selected coding mode, and the selected coding mode is assigned to the current coding unit in accordance with a determination of a valid status for the selected coding mode.

In some embodiments of the apparatus, in an instance in which the selected coding mode comprises a History-Based Motion Vector Prediction (HMVP) mode, the at least one memory and the computer program code are further configured to, with the at least one processor, cause the apparatus to access information associated with the current coding unit, the information comprising an amount of coding unit references, each coding unit reference associated with a respective coding unit of the plurality of coding units that has previously undergone an inter coding operation.

The at least one memory and the computer program code are further configured to, with the at least one processor, cause the apparatus to determine at least one candidate coding unit reference of the predefined amount of coding unit references based at least upon a comparison of an index value associated with the at least one candidate coding unit reference to a dirty index, the dirty index comprising an index value of a coding unit of the plurality of coding units last to have undergone an inter coding operation while within a dirty area of the picture. The at least one memory and the computer program code are further configured to, with the at least one processor, cause the apparatus to assign at least one coding unit associated with the at least one candidate coding unit reference to a candidate list for selection in a coding process for the current coding unit.

In another embodiment, a method is provided. The method comprises obtaining a current coding unit of a picture, the picture comprising a plurality of coding units including the current coding unit. The method also comprises, based at least on the current coding unit, determining a validity status for at least a portion of a plurality of coding modes, wherein the validity status comprises one a valid status or an invalid status. The method also comprises determining a coding cost for at least a portion of the plurality of coding modes. The method also comprises assigning a selected coding mode to the current coding unit based at least one of the validity status or the coding cost of the selected coding mode.

In some embodiments of the method, determining the validity status for at least the portion of the plurality of coding modes comprises determining the validity status for each of the plurality of coding modes, determining the coding cost for at least the portion of the plurality of coding modes comprises determining the coding cost for each coding mode of the plurality of coding modes associated with a valid status, and the selected coding mode is determined based on a comparison of coding costs for the each coding mode of the plurality of coding modes associated with a valid status.

In some embodiments of the method, determining the coding cost for at least the portion of the plurality of coding modes comprises determining the coding cost for each coding mode of the plurality of coding modes, and the selected coding mode is determined based on based on the selected coding mode having a lowest coding cost while also having a valid status.

In some embodiments of the method, each coding mode of the plurality of coding modes is associated with a respective coding mode subgroup, determining the validity status for at least the portion of the plurality of coding modes comprises determining the validity status for each of the plurality of coding modes, determining the coding cost for at least the portion of the plurality of coding modes comprises determining the coding cost for each coding mode of the plurality of coding modes associated with a valid status, and the method further comprises determining, for each coding mode subgroup, a respective candidate coding mode having a lowest coding cost of the coding costs of the coding modes associated with the coding mode subgroup, and the selected coding mode is determined based on a comparison of coding costs for each of the candidate coding modes.

In some embodiments of the method, each coding mode of the plurality of coding modes is associated with a respective coding mode subgroup, determining the coding cost for at least the portion of the plurality of coding modes comprises determining the coding cost for each coding mode of the plurality of coding modes, and the method further comprises determining, for each coding mode subgroup, a respective candidate coding mode having a lowest coding cost of the coding costs of the coding modes associated with the coding mode subgroup while also having a valid status, the selected coding mode being determined based on a comparison of coding costs for each of the candidate coding modes.

In some embodiments of the method, each coding mode of the plurality of coding modes is associated with a respective coding mode subgroup, determining the coding cost for at least the portion of the plurality of coding modes comprises determining the coding cost for each coding mode of the plurality of coding modes, and the method further comprises determining, for each coding mode subgroup, a respective candidate coding mode having a lowest coding cost of the coding costs of the coding modes associated with the coding mode subgroup, determining the validity status for at least the portion of the plurality of coding modes comprises determining a validity status for each candidate coding mode, and the selected coding mode is selected based on having a lowest coding cost of the coding costs associated with the candidate coding modes determined to have a valid status.

In some embodiments of the method, determining the coding cost for at least the portion of the plurality of coding modes comprises determining the coding cost for each coding mode of the plurality of coding modes, the selected coding mode is determined based on the selected coding mode having the lowest coding cost of the coding costs determined for the plurality of coding modes, determining the validity status for at least the portion of the plurality of coding modes comprises determining the validity status for the selected coding mode, and the selected coding mode is assigned to the current coding unit in accordance with a determination of a valid status for the selected coding mode.

In some embodiments of the method, in an instance in which the selected coding mode comprises a History-Based Motion Vector Prediction (HMVP) mode, the method further comprises accessing information associated with the current coding unit, the information comprising an amount of coding unit references, each coding unit reference associated with a respective coding unit of the plurality of coding units that has previously undergone an inter coding operation, determining at least one candidate coding unit reference of the predefined amount of coding unit references based at least upon a comparison of an index value associated with the at least one candidate coding unit reference to a dirty index, the dirty index comprising an index value of a coding unit of the plurality of coding units last to have undergone an inter coding operation while within a dirty area of the picture, and assigning at least one coding unit associated with the at least one candidate coding unit reference to a candidate list for selection in a coding process for the current coding unit.

In another embodiment, an apparatus is provided. The apparatus comprises means for obtaining a current coding unit of a picture, the picture comprising a plurality of coding units including the current coding unit. The apparatus also comprises means for, based at least on the current coding unit, determining a validity status for at least a portion of a plurality of coding modes, wherein the validity status comprises one a valid status or an invalid status. The apparatus also comprises means for determining a coding cost for at least a portion of the plurality of coding modes. The apparatus also comprises means for assigning a selected coding mode to the current coding unit based at least one of the validity status or the coding cost of the selected coding mode.

In some embodiments of the apparatus, determining the validity status for at least the portion of the plurality of coding modes comprises determining the validity status for each of the plurality of coding modes, determining the coding cost for at least the portion of the plurality of coding modes comprises determining the coding cost for each coding mode of the plurality of coding modes associated with a valid status, and the selected coding mode is determined based on a comparison of coding costs for the each coding mode of the plurality of coding modes associated with a valid status.

In some embodiments of the apparatus, determining the coding cost for at least the portion of the plurality of coding modes comprises determining the coding cost for each coding mode of the plurality of coding modes, and the selected coding mode is determined based on based on the selected coding mode having a lowest coding cost while also having a valid status.

In some embodiments of the apparatus, each coding mode of the plurality of coding modes is associated with a respective coding mode subgroup, determining the validity status for at least the portion of the plurality of coding modes comprises determining the validity status for each of the plurality of coding modes, determining the coding cost for at least the portion of the plurality of coding modes comprises determining the coding cost for each coding mode of the plurality of coding modes associated with a valid status, and the apparatus further comprises means for determining, for each coding mode subgroup, a respective candidate coding mode having a lowest coding cost of the coding costs of the coding modes associated with the coding mode subgroup, and the selected coding mode is determined based on a comparison of coding costs for each of the candidate coding modes.

In some embodiments of the apparatus, each coding mode of the plurality of coding modes is associated with a respective coding mode subgroup, determining the coding cost for at least the portion of the plurality of coding modes comprises determining the coding cost for each coding mode of the plurality of coding modes, and the apparatus further comprises means for determining, for each coding mode subgroup, a respective candidate coding mode having a lowest coding cost of the coding costs of the coding modes associated with the coding mode subgroup while also having a valid status, the selected coding mode being determined based on a comparison of coding costs for each of the candidate coding modes.

In some embodiments of the apparatus, each coding mode of the plurality of coding modes is associated with a respective coding mode subgroup, determining the coding cost for at least the portion of the plurality of coding modes comprises determining the coding cost for each coding mode of the plurality of coding modes, and the apparatus further comprises means for determining, for each coding mode subgroup, a respective candidate coding mode having a lowest coding cost of the coding costs of the coding modes associated with the coding mode subgroup, and determining the validity status for at least the portion of the plurality of coding modes comprises determining a validity status for each candidate coding mode, and the selected coding mode is selected based on having a lowest coding cost of the coding costs associated with the candidate coding modes determined to have a valid status.

In some embodiments of the apparatus, determining the coding cost for at least the portion of the plurality of coding modes comprises determining the coding cost for each coding mode of the plurality of coding modes, the selected coding mode is determined based on the selected coding mode having the lowest coding cost of the coding costs determined for the plurality of coding modes, determining the validity status for at least the portion of the plurality of coding modes comprises determining the validity status for the selected coding mode, and the selected coding mode is assigned to the current coding unit in accordance with a determination of a valid status for the selected coding mode.

In some embodiments of the apparatus, in an instance in which the selected coding mode comprises a History-Based Motion Vector Prediction (HMVP) mode, the apparatus further comprises means for accessing information associated with the current coding unit, the information comprising an amount of coding unit references, each coding unit reference associated with a respective coding unit of the plurality of coding units that has previously undergone an inter coding operation, means for determining at least one candidate coding unit reference of the predefined amount of coding unit references based at least upon a comparison of an index value associated with the at least one candidate coding unit reference to a dirty index, the dirty index comprising an index value of a coding unit of the plurality of coding units last to have undergone an inter coding operation while within a dirty area of the picture, and means for assigning at least one coding unit associated with the at least one candidate coding unit reference to a candidate list for selection in a coding process for the current coding unit.

In another embodiment, a computer program product is provided that comprises a non-transitory computer readable storage medium having program code portions stored thereon. The program code portions are configured, upon execution, to obtain a current coding unit of a picture, the picture comprising a plurality of coding units including the current coding unit. The program code portions are also configured, upon execution, to, based at least on the current coding unit, determine a validity status for at least a portion of a plurality of coding modes, the validity status comprising one of a valid status or an invalid status. The program code portions are also configured, upon execution, to determine a coding cost for at least a portion of the plurality of coding modes. The program code portions are also configured, upon execution, to assign a selected coding mode to the current coding unit based at least one of the validity status or the coding cost of the selected coding mode.

In some embodiments of the computer program product, determining the validity status for at least the portion of the plurality of coding modes comprises determining the validity status for each of the plurality of coding modes, determining the coding cost for at least the portion of the plurality of coding modes comprises determining the coding cost for each coding mode of the plurality of coding modes associated with a valid status, and the selected coding mode is determined based on a comparison of coding costs for the each coding mode of the plurality of coding modes associated with a valid status.

In some embodiments of the computer program product, determining the coding cost for at least the portion of the plurality of coding modes comprises determining the coding cost for each coding mode of the plurality of coding modes, and the selected coding mode is determined based on based on the selected coding mode having a lowest coding cost while also having a valid status.

In some embodiments of the computer program product, each coding mode of the plurality of coding modes is associated with a respective coding mode subgroup, determining the validity status for at least the portion of the plurality of coding modes comprises determining the validity status for each of the plurality of coding modes, determining the coding cost for at least the portion of the plurality of coding modes comprises determining the coding cost for each coding mode of the plurality of coding modes associated with a valid status, and the program code portions are further configured, upon execution, to determine, for each coding mode subgroup, a respective candidate coding mode having a lowest coding cost of the coding costs of the coding modes associated with the coding mode subgroup, the selected coding mode being determined based on a comparison of coding costs for each of the candidate coding modes.

In some embodiments of the computer program product, each coding mode of the plurality of coding modes is associated with a respective coding mode subgroup, determining the coding cost for at least the portion of the plurality of coding modes comprises determining the coding cost for each coding mode of the plurality of coding modes, and the program code portions are further configured, upon execution, to determine, for each coding mode subgroup, a respective candidate coding mode having a lowest coding cost of the coding costs of the coding modes associated with the coding mode subgroup while also having a valid status, the selected coding mode being determined based on a comparison of coding costs for each of the candidate coding modes.

In some embodiments of the computer program product, each coding mode of the plurality of coding modes is associated with a respective coding mode subgroup, determining the coding cost for at least the portion of the plurality of coding modes comprises determining the coding cost for each coding mode of the plurality of coding modes, and the program code portions are further configured, upon execution, to determine, for each coding mode subgroup, a respective candidate coding mode having a lowest coding cost of the coding costs of the coding modes associated with the coding mode subgroup, determining the validity status for at least the portion of the plurality of coding modes comprises determining a validity status for each candidate coding mode, and the selected coding mode is selected based on having a lowest coding cost of the coding costs associated with the candidate coding modes determined to have a valid status.

In some embodiments of the computer program product, determining the coding cost for at least the portion of the plurality of coding modes comprises determining the coding cost for each coding mode of the plurality of coding modes, the selected coding mode is determined based on the selected coding mode having the lowest coding cost of the coding costs determined for the plurality of coding modes, determining the validity status for at least the portion of the plurality of coding modes comprises determining the validity status for the selected coding mode, and the selected coding mode is assigned to the current coding unit in accordance with a determination of a valid status for the selected coding mode.

In some embodiments of the computer program product, in an instance in which the selected coding mode comprises a History-Based Motion Vector Prediction (HMVP) mode, the program code portions are further configured, upon execution, to access information associated with the current coding unit, the information comprising an amount of coding unit references, each coding unit reference associated with a respective coding unit of the plurality of coding units that has previously undergone an inter coding operation. The program code portions are further configured, upon execution, to determine at least one candidate coding unit reference of the predefined amount of coding unit references based at least upon a comparison of an index value associated with the at least one candidate coding unit reference to a dirty index, the dirty index comprising an index value of a coding unit of the plurality of coding units last to have undergone an inter coding operation while within a dirty area of the picture. The program code portions are further configured, upon execution, to assign at least one coding unit associated with the at least one candidate coding unit reference to a candidate list for selection in a coding process for the current coding unit.

BRIEF DESCRIPTION OF THE DRAWINGS

Figure 1:
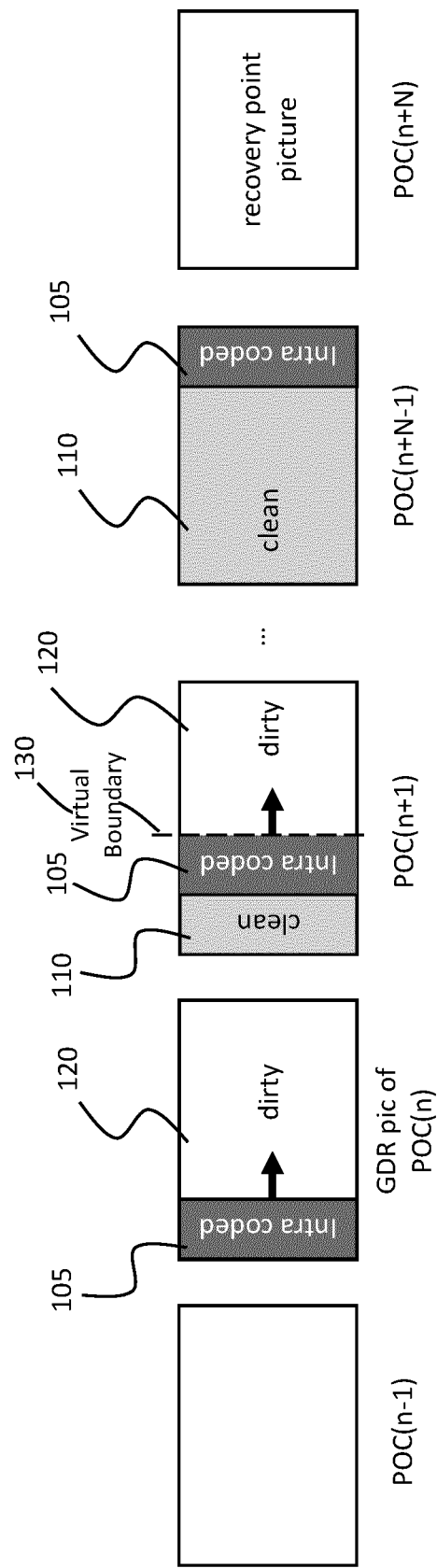
Figure 2A:
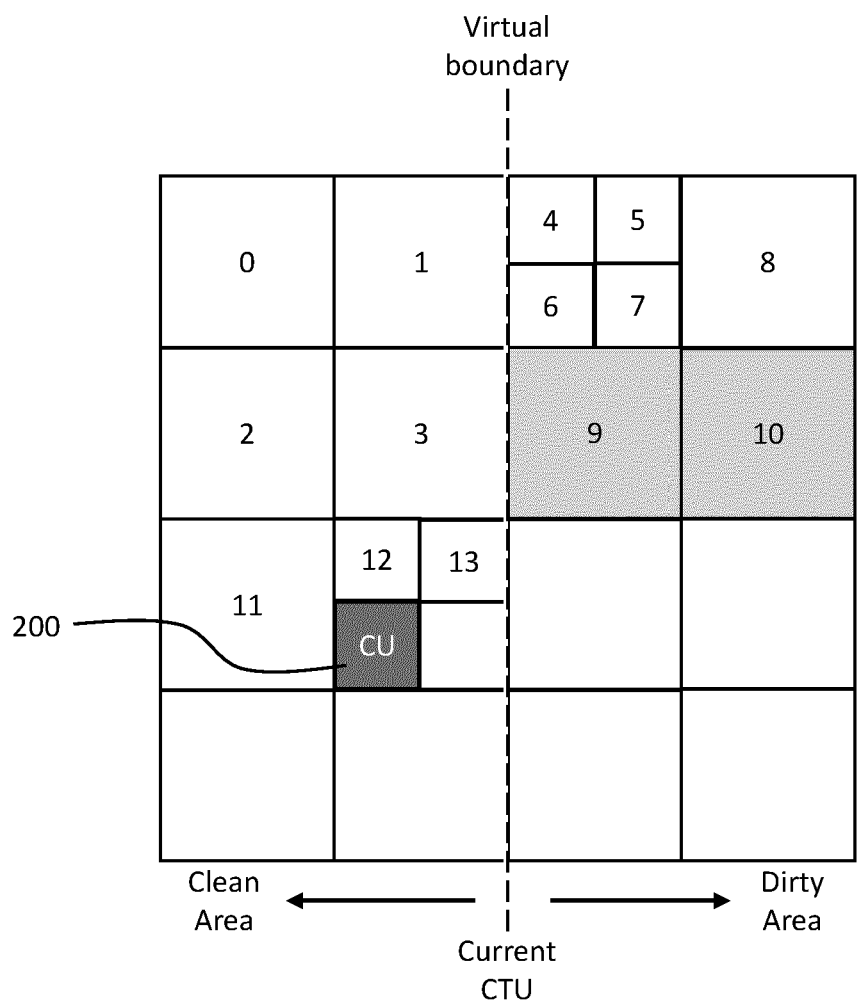
Figure 2B:
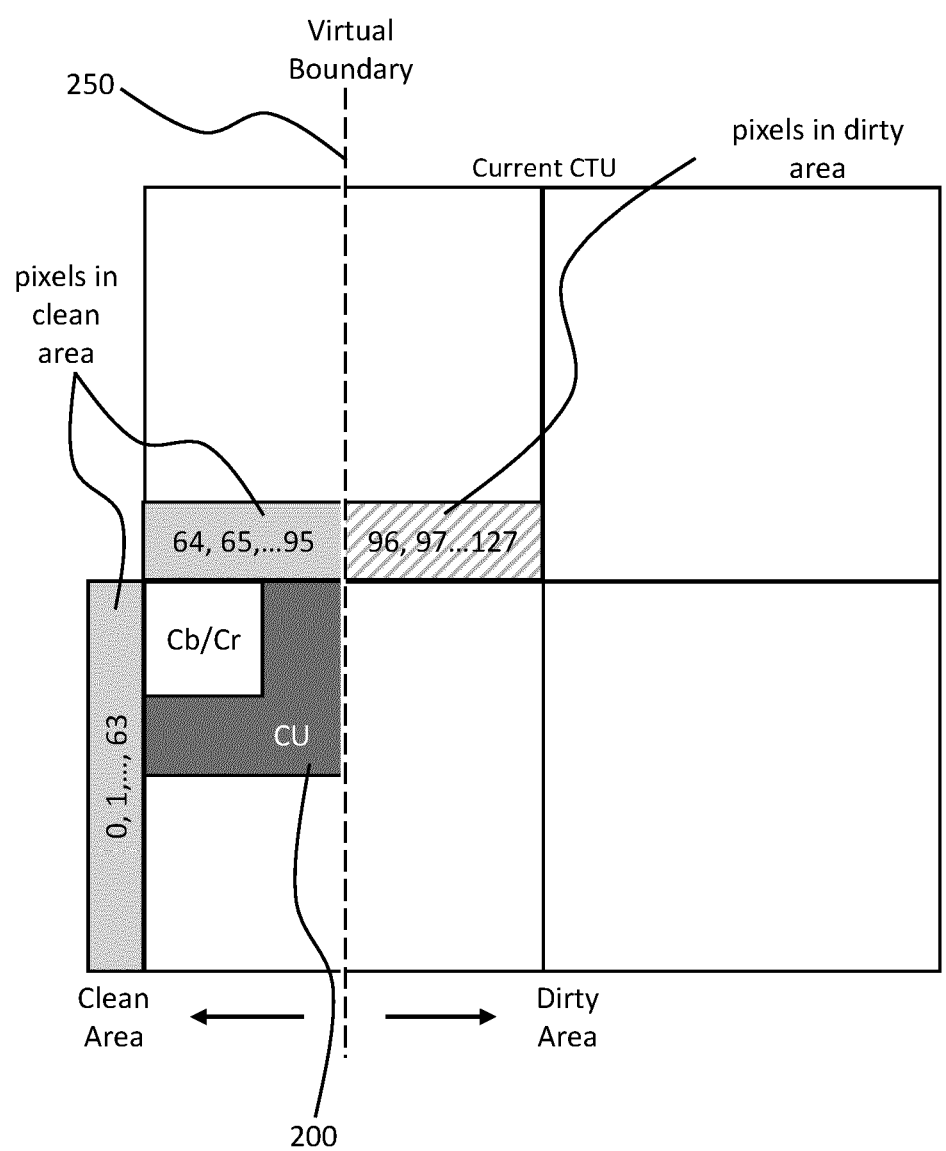
Figure 2C:
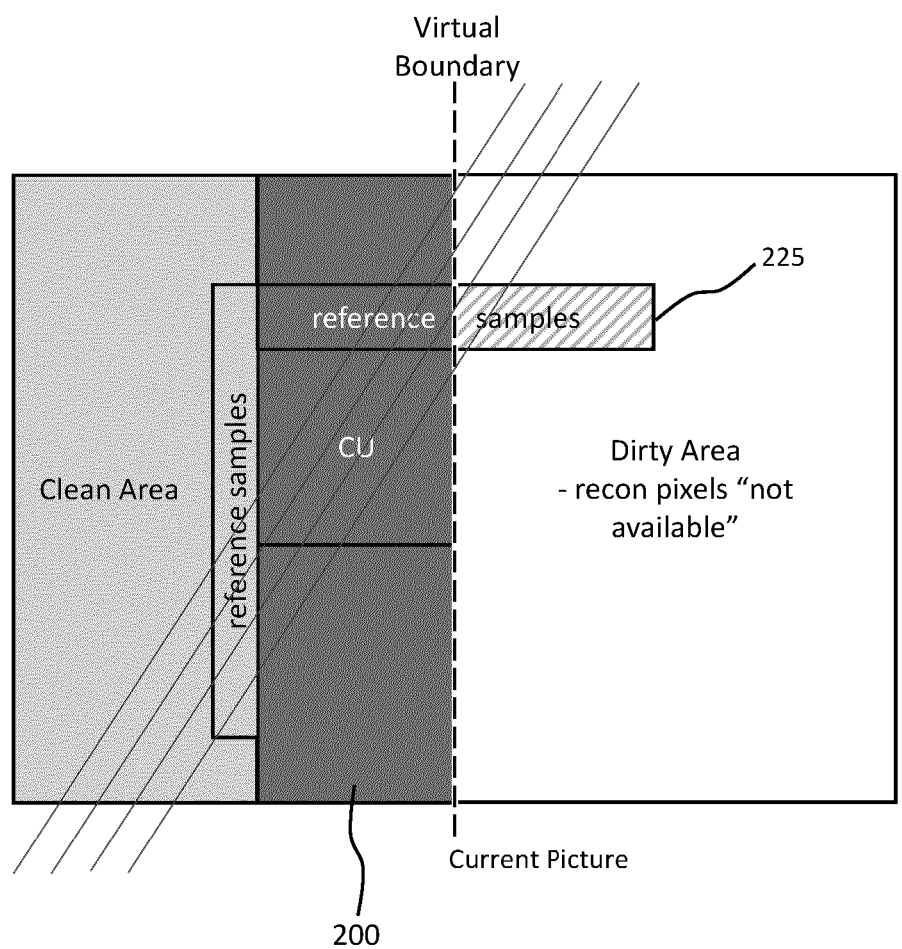
Figure 2D:
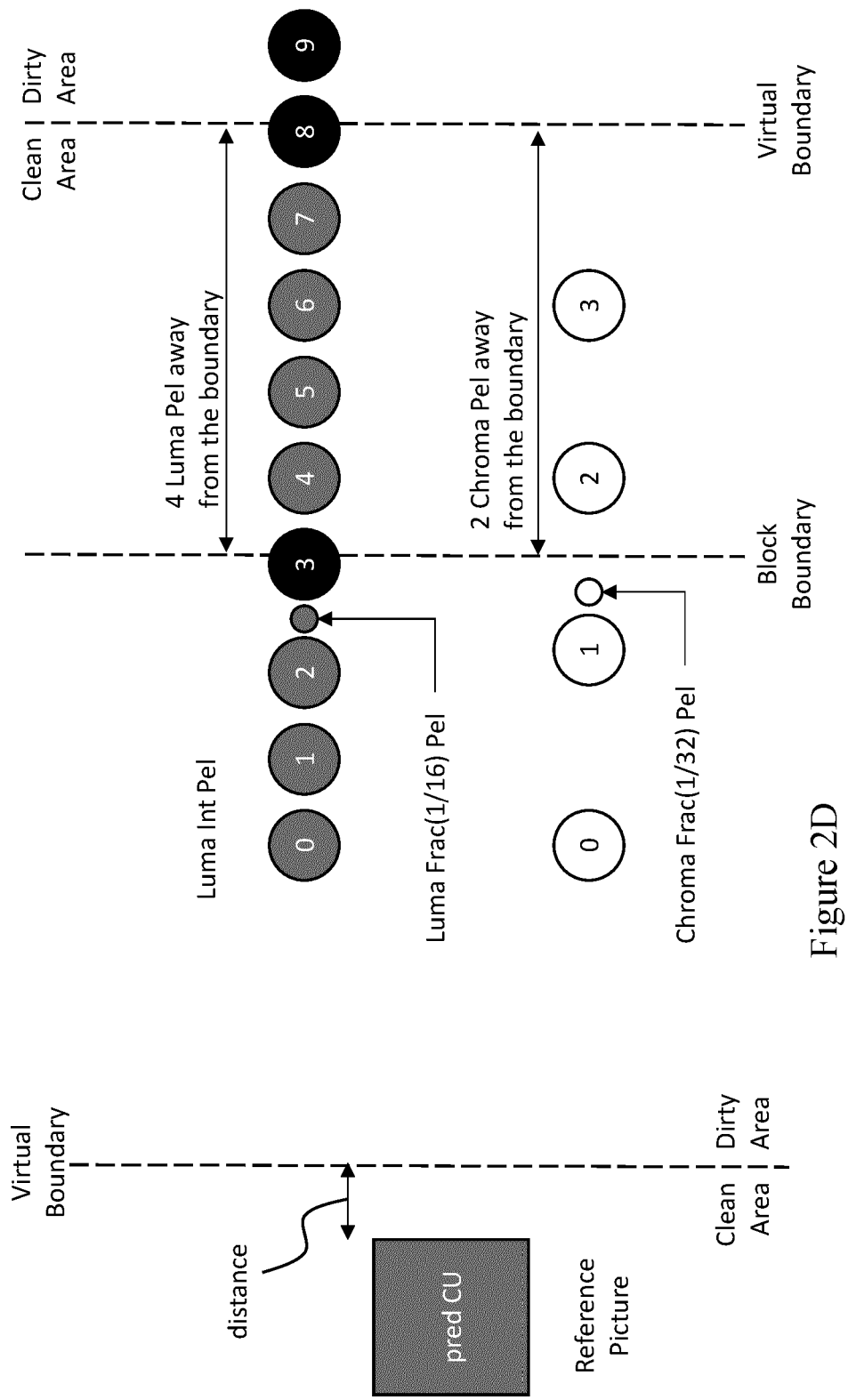
Figure 2E:
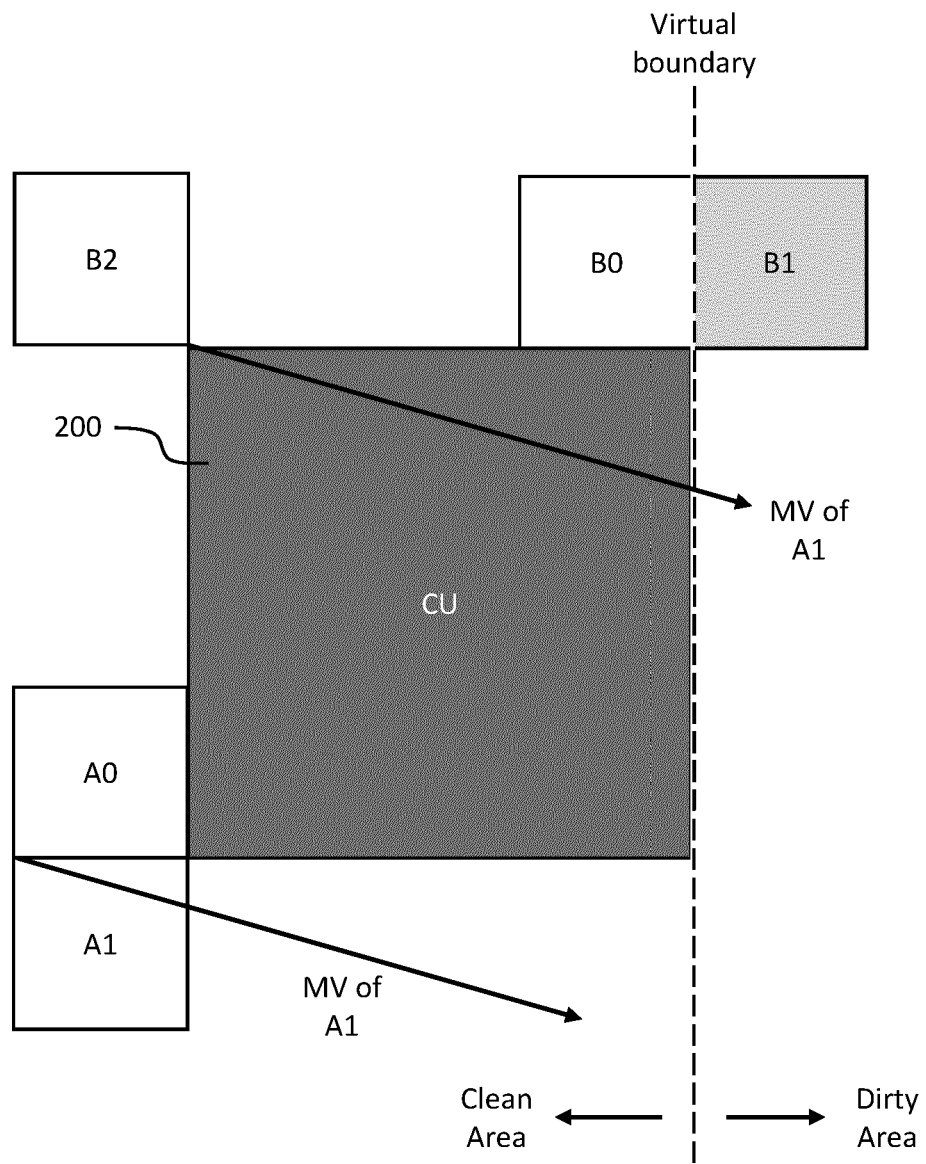
Figure 2F:
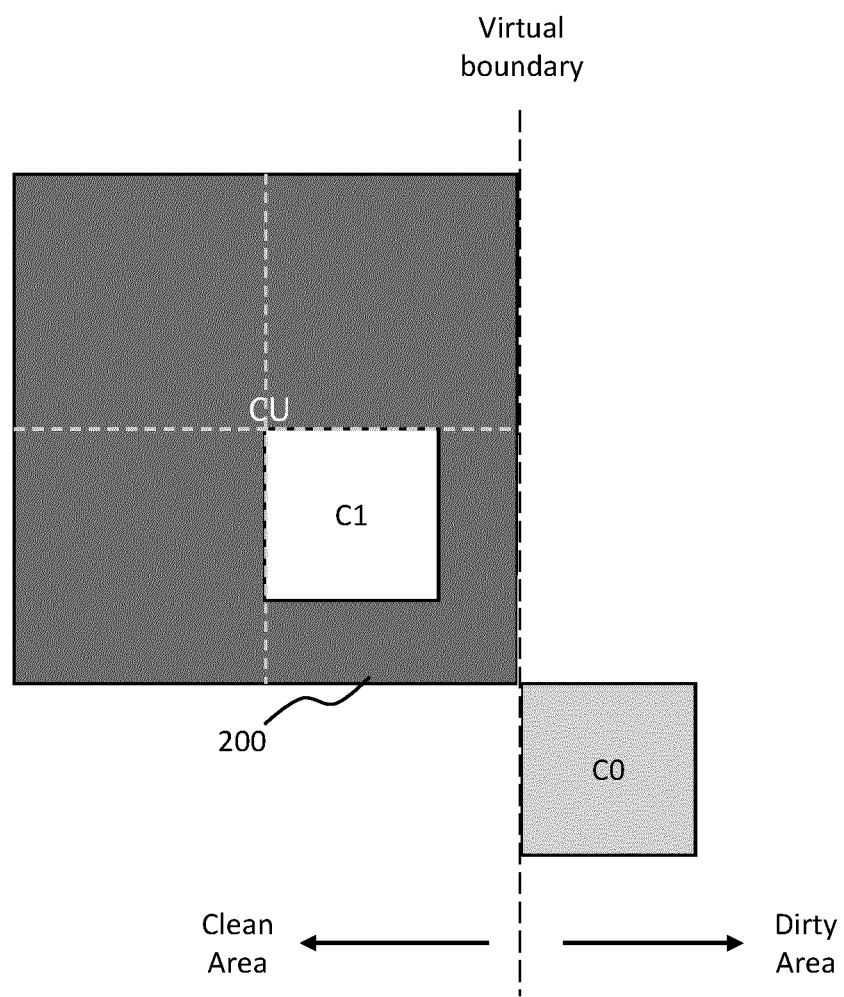
Figure 2G:
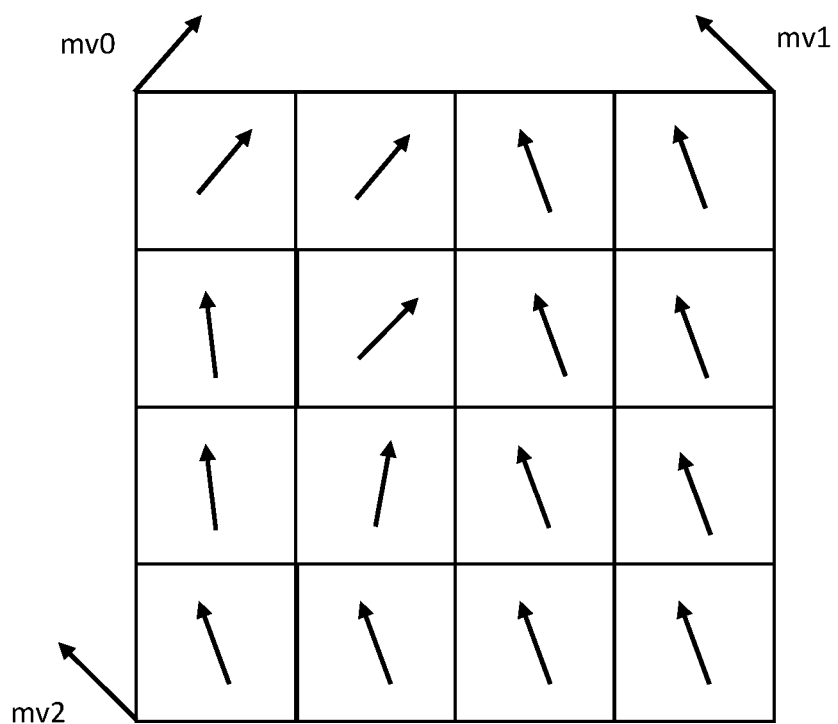
Figure 2H:
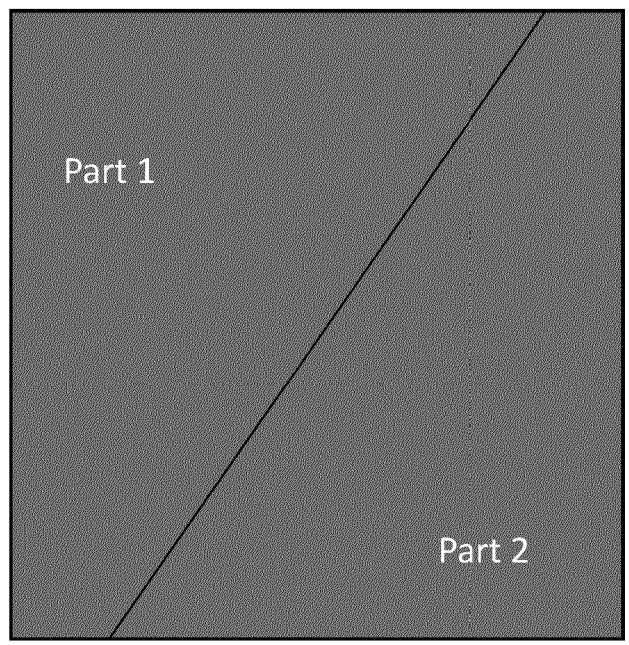
Figure 3:
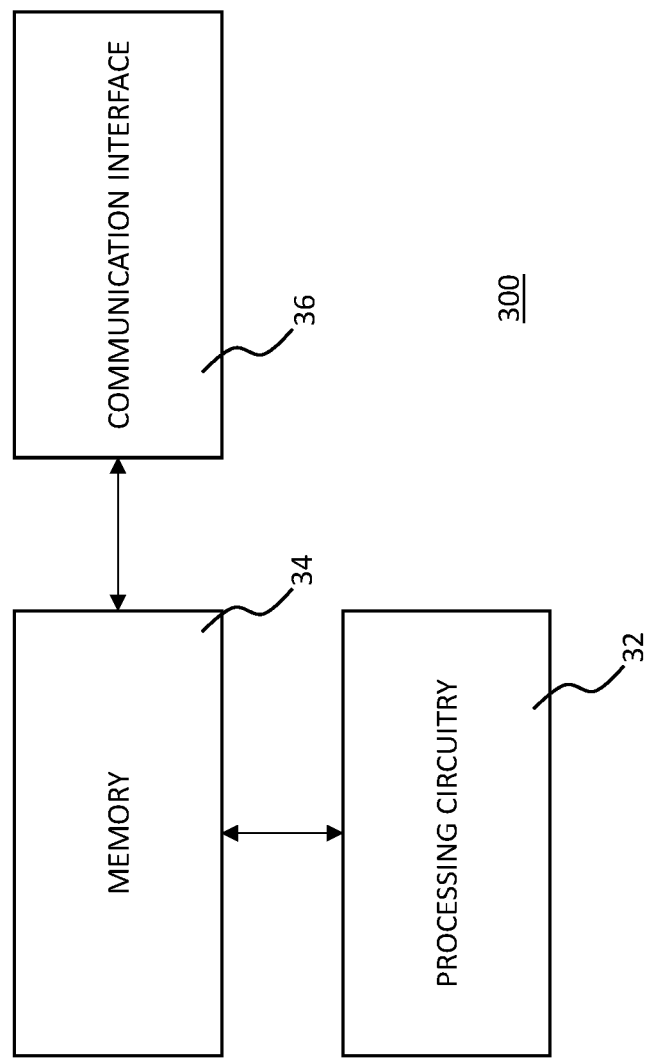
Figure 4A:
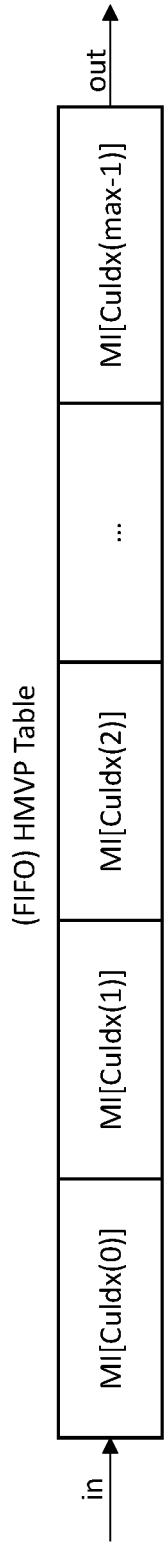
Figure 4B:
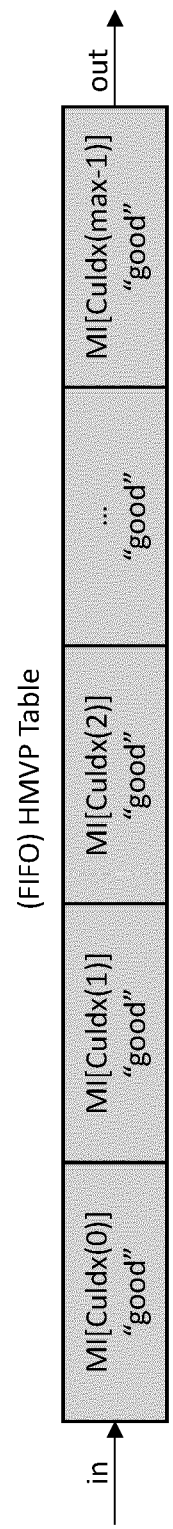
Figure 4C:
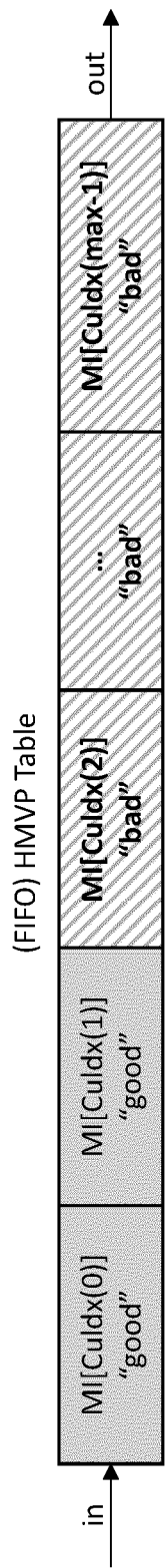
Figure 4D:
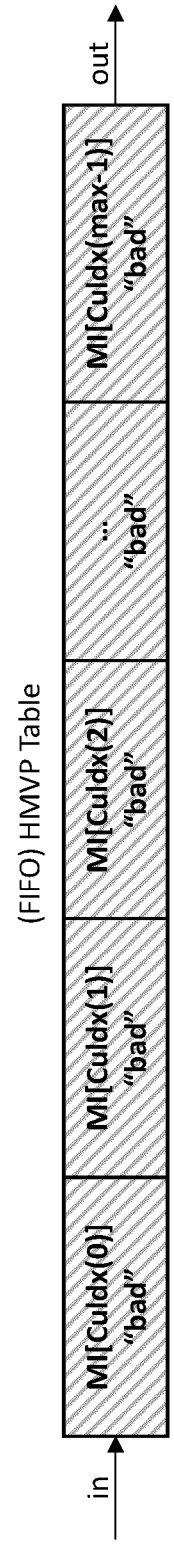
Figure 6:
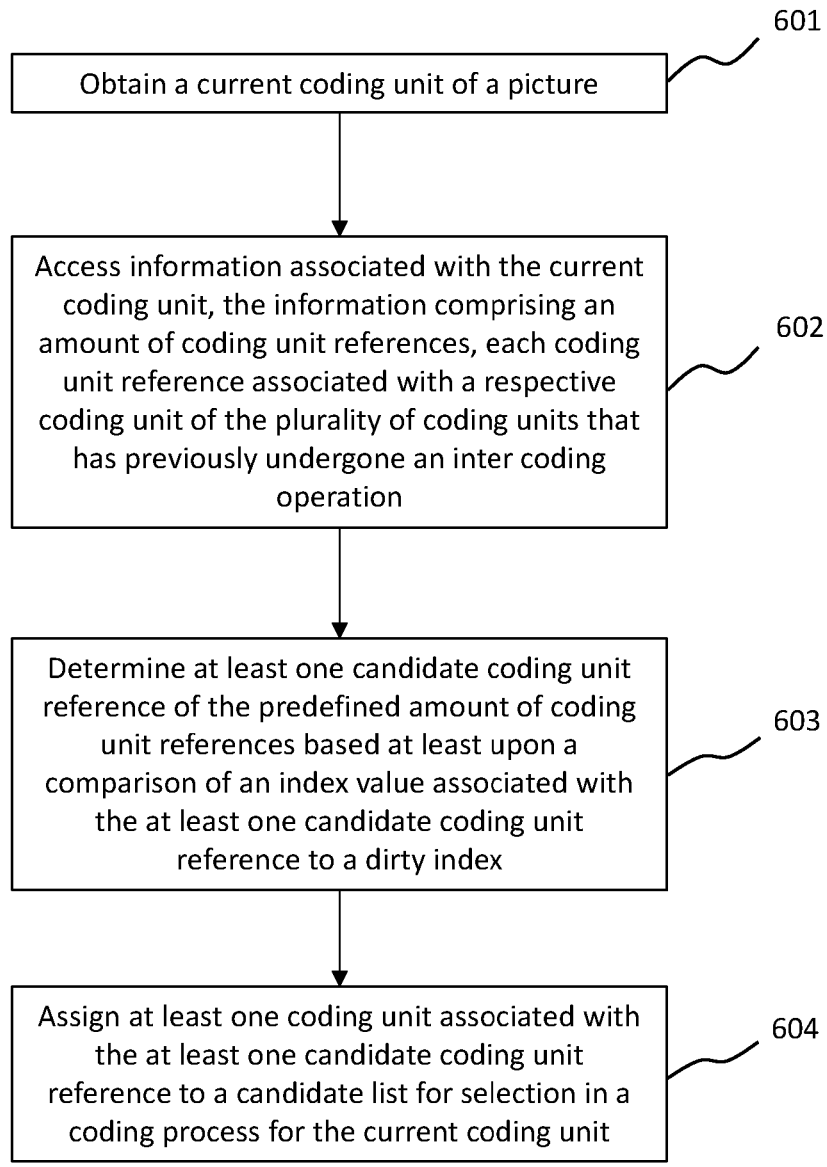

Having thus described certain example embodiments of the present disclosure in general terms, reference will hereinafter be made to the accompanying drawings, which are not necessarily drawn to scale, and wherein:

FIG. 1 is a representation of example pictures within a GDR period wherein a clean area and a dirty area are separated by a virtual boundary in accordance with an example embodiment of the present disclosure;

FIG. 2A is a representation of an example picture comprising a plurality of coding units undergoing a gradual decoding refresh in accordance with an example embodiment of the present disclosure;

FIG. 2B is a representation of an example picture comprising a plurality of coding units undergoing a gradual decoding refresh with Luma Mapping with Chroma Scaling (LMCS) in accordance with an example embodiment of the present disclosure;

FIG. 2C is a representation of an example picture comprising a plurality of coding units undergoing a gradual decoding refresh with an angular intra mode in accordance with an example embodiment of the present disclosure;

FIG. 2D is a representation of an example picture wherein a block pointed by a fractional motion vector is a predefined amount of luma pixels away from the vertical virtual boundary in accordance with an example embodiment of the present disclosure;

FIG. 2E is a representation of example spatial neighboring coding units of a current coding unit in accordance with an example embodiment of the present disclosure;

FIG. 2F is a representation of an example current coding unit and associated collocated coding units in accordance with an example embodiment of the present disclosure;

FIG. 2G is a representation of example motion vector prediction using Affine Merge in accordance with an example embodiment of the present disclosure;

FIG. 2H is a representation of an example current coding unit divided into two partitions by Geometry Partitioning Mode (GPM) in accordance with an example embodiment of the present disclosure;

FIG. 3 is a block diagram of an apparatus that may be specifically configured in accordance with an example embodiment of the present disclosure;

FIG. 4A is a representation of an example History-Based Motion Vector Prediction (HMVP) table in accordance with an example embodiment of the present disclosure;

FIG. 4B is a representation of an example History-Based Motion Vector Prediction (HMVP) table in accordance with an example embodiment of the present disclosure;

FIG. 4C is a representation of an example History-Based Motion Vector Prediction (HMVP) table in accordance with an example embodiment of the present disclosure;

FIG. 4D is a representation of an example History-Based Motion Vector Prediction (HMVP) table in accordance with an example embodiment of the present disclosure;

FIG. 5A is a representation of an example merge candidate list in accordance with an example embodiment;

FIG. 5B is a representation of an example merge candidate list in accordance with an example embodiment;

FIG. 5C is a representation of an example merge candidate list in accordance with an example embodiment;

FIG. 5D is a representation of an example Advanced Motion Vector Prediction (AMVP) candidate list in accordance with an example embodiment;

FIG. 5E is a representation of an example AMVP candidate list in accordance with an example embodiment;

FIG. 6 is a flow diagram illustrating operations performed in accordance with an example embodiment.

Figure 7:
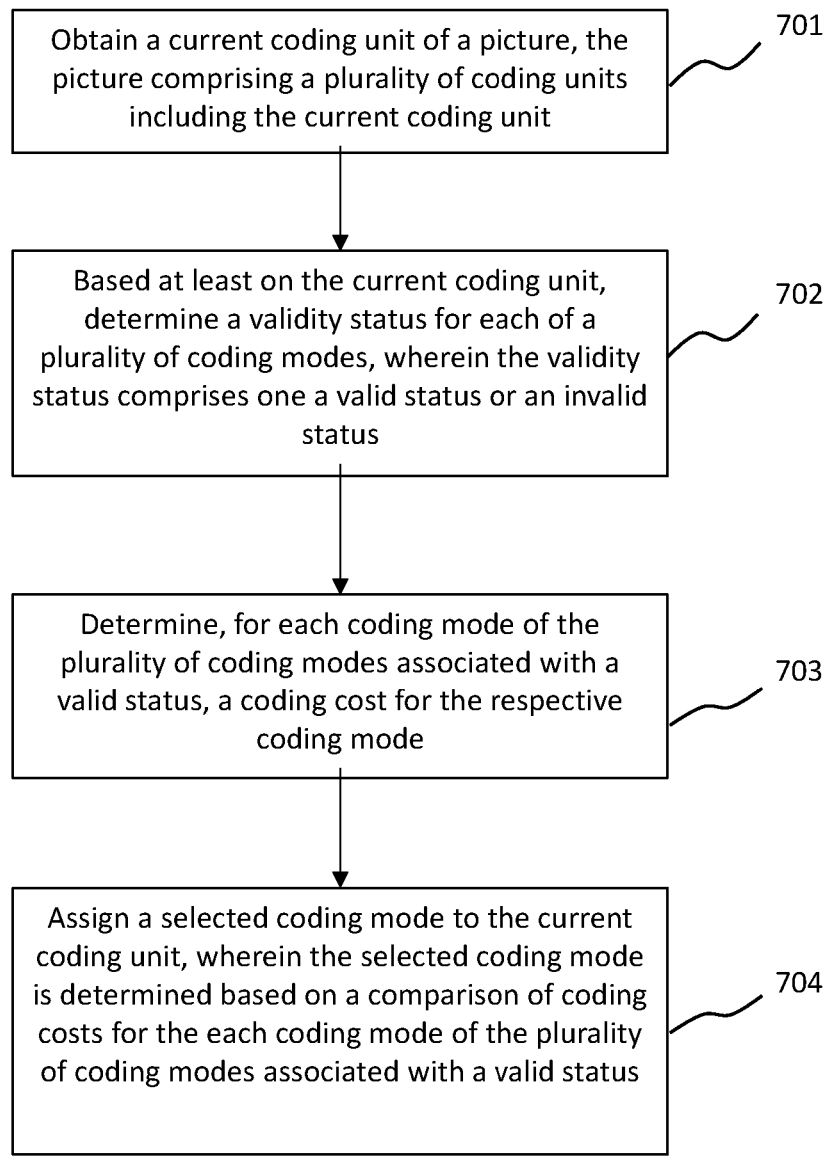
Figure 8:
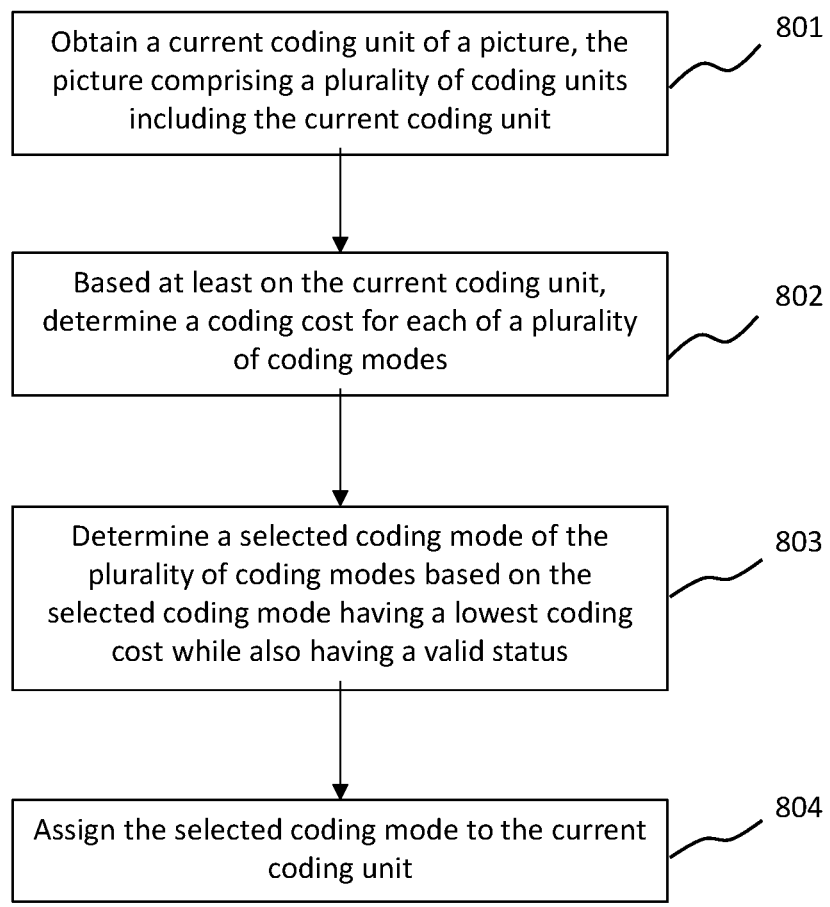
Figure 9:
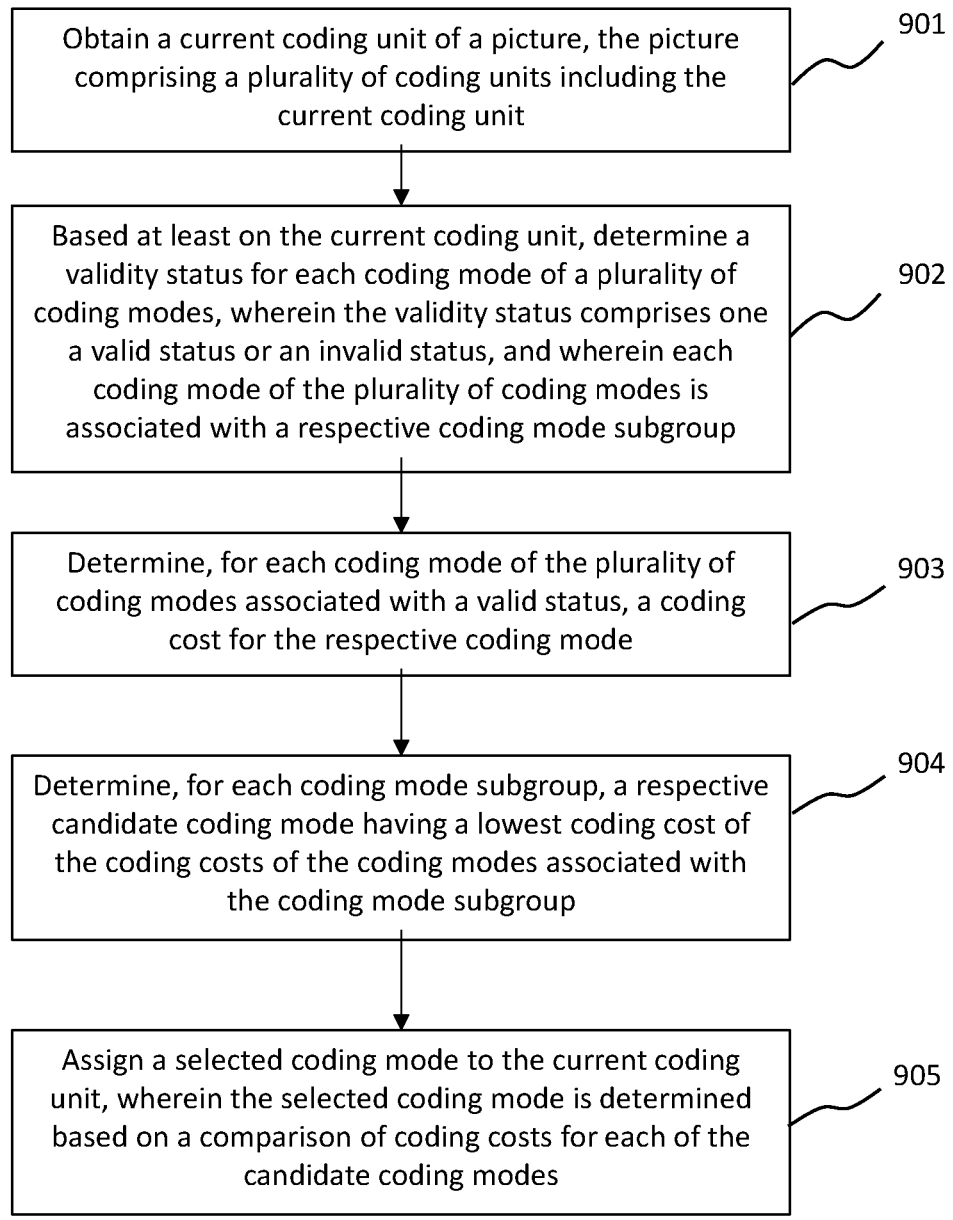
Figure 10:
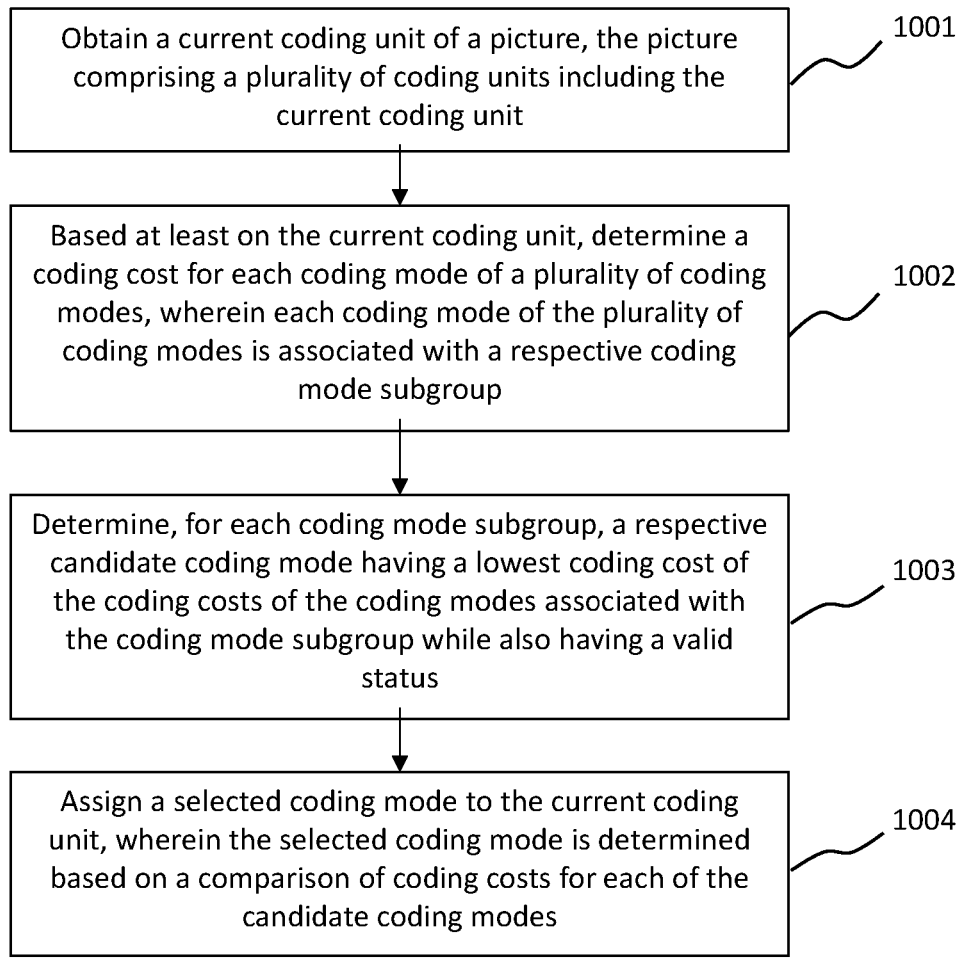
Figure 11:
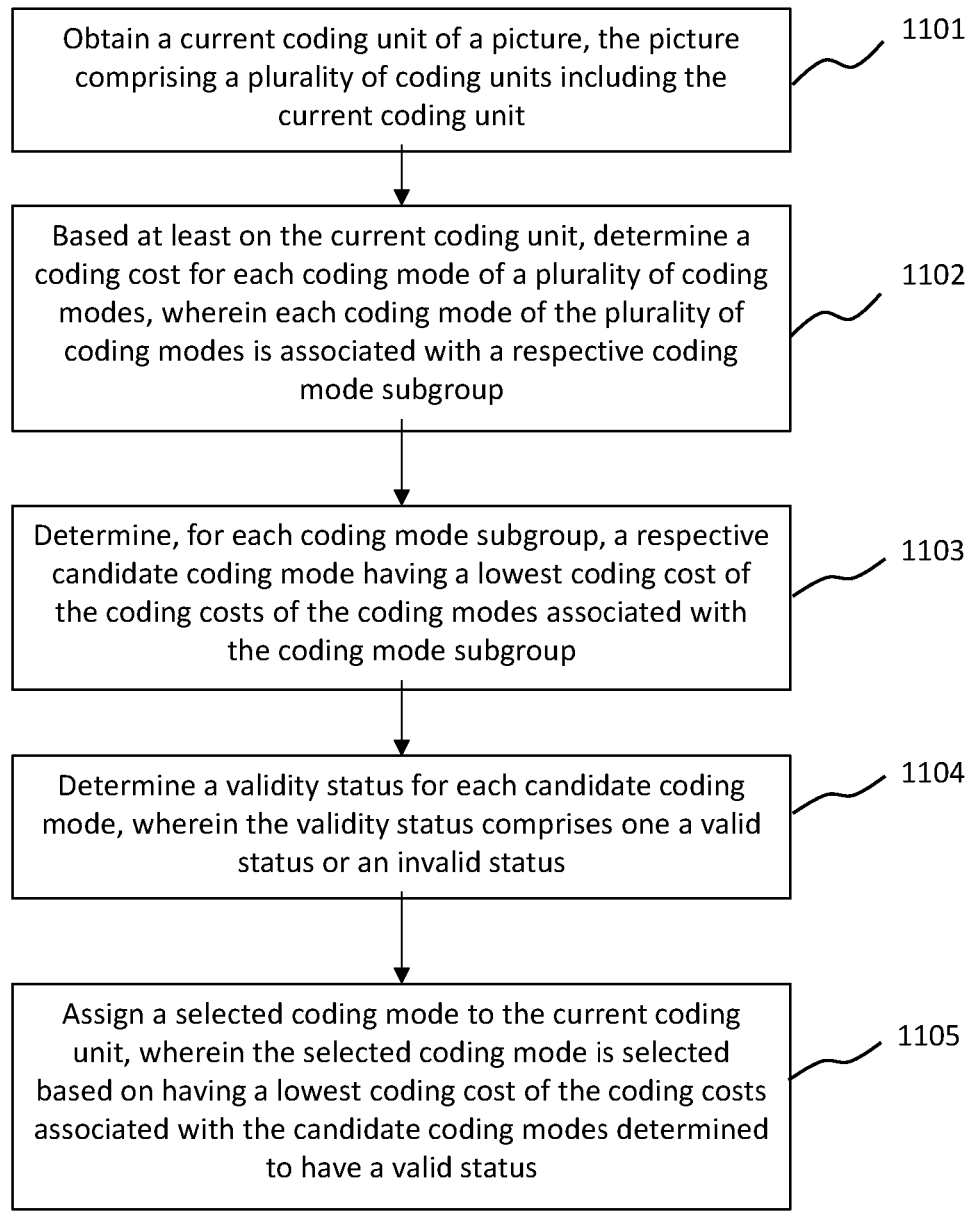
Figure 12:
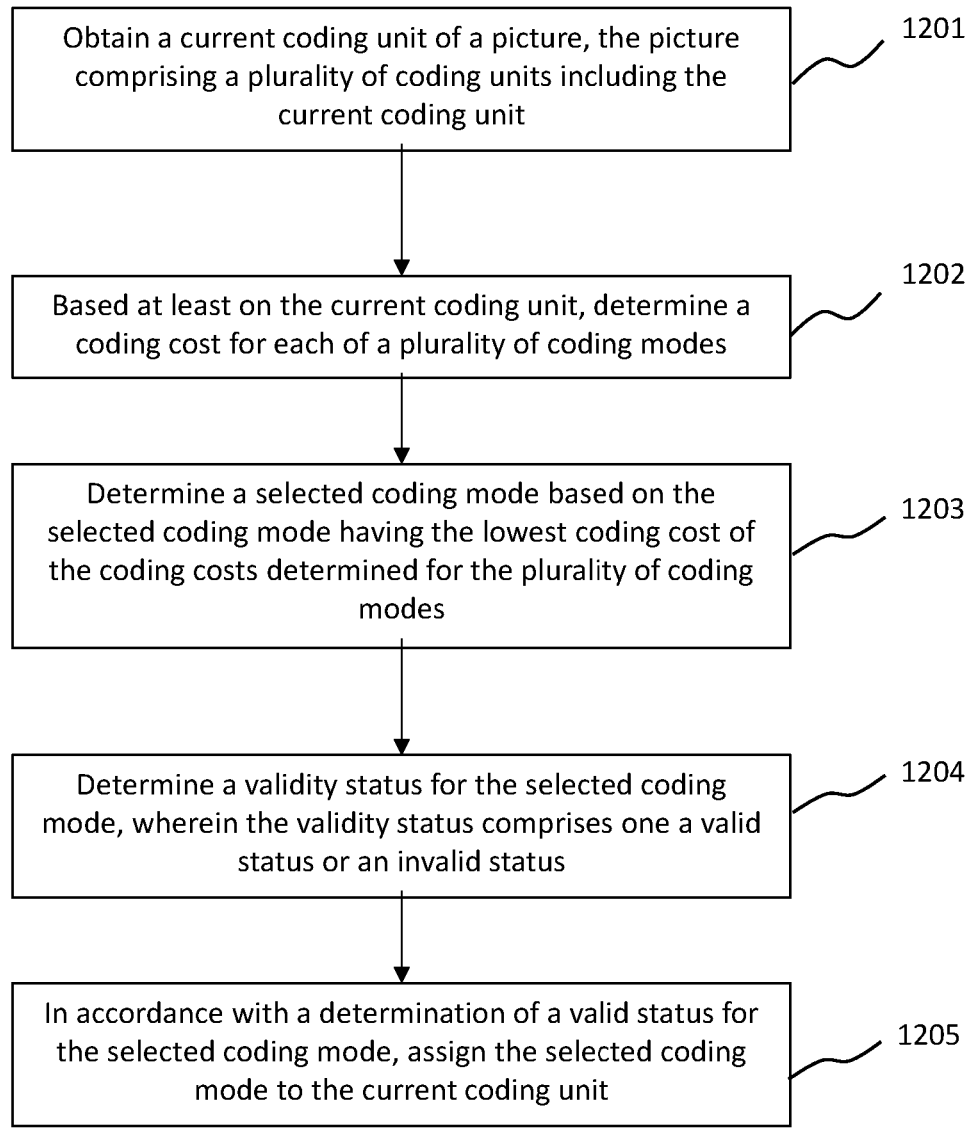

FIG. 7 is a flow diagram illustrating operations performed in accordance with an example embodiment;

FIG. 8 is a flow diagram illustrating operations performed in accordance with an example embodiment;

FIG. 9 is a flow diagram illustrating operations performed in accordance with an example embodiment;

FIG. 10 is a flow diagram illustrating operations performed in accordance with an example embodiment;

FIG. 11 is a flow diagram illustrating operations performed in accordance with an example embodiment; and FIG. 12 is a flow diagram illustrating operations performed in accordance with an example embodiment.

DETAILED DESCRIPTION

Some embodiments of the present disclosure will now be described more fully hereinafter with reference to the accompanying drawings, in which some, but not all, embodiments of the disclosure are shown. Indeed, some embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

In the Versatile Video Coding (VVC) Specification (B. Bross, J. Chen, S. Lin, and Y-K. Wang, "Versatile Video Coding", JVET-Q2001-v13, January 2020, which is incorporated by reference herein, and hereinafter referred to as the "VVC Specification"), as well as in other video coding design applications such as Advanced Video Coding (AVC) and High Efficiency Video Coding (HEVC), a coded video sequence may comprise intra coded pictures and inter coded pictures. Intra coded pictures typically use more bits than inter coded pictures, such that transmission time of intra coded pictures increases the encoder to decoder delay. For (ultra) low delay applications, it may be preferred that all coded pictures have a similar number of bits so that the encoder to decoder delay can be reduced to around one (1) picture interval. Hence, intra coded pictures seem to not be ideal for (ultra) low delay applications. However, an intra coded picture is needed at a random access point.

As described above, GDR may alleviate the delay issue with intra coded pictures. For example, instead of coding an intra picture at a random access point, GDR progressively refreshes pictures by spreading intra coded areas over several pictures FIG. 1 depicts an example of a vertical GDR, which progressively intra refreshes pictures within a GDR period. The GDR period includes N total pictures, and the period begins with picture POC(n), which can be referred to as the GDR picture, and ends with picture POC(n+N−1). During the GDR period, forced intra coded areas 105 gradually spread over the N pictures of the GDR period from left to right. Picture POC(n+N), after the GDR period, can be referred to as a recovery point picture. The pictures between the GDR picture POC(n) and the recovery point picture POC(n+N) are referred to as recovering pictures. In this regard, pictures within a GDR period are undergoing a gradual decoding refresh.

In some instances, a current picture within a GDR period comprises a clean (refreshed) area 110 and a dirty (non-refreshed) area 120, wherein the clean area 110 may comprise a forced intra coded area 105 next to the dirty area 120 for progressive intra refresh (PIR), as shown in the picture POC(n+1). For example, a typical GDR picture consists of clean area (e.g., an area that has undergone an intra refresh) and dirty area (e.g., an area that has not yet undergone an intra refresh). A virtual boundary 130 between the clean area 110 and the dirty area 120 may be signalled, for example, by virtual boundary syntax in Picture Header.

VVC has adopted Picture Header, which includes virtual boundary syntax. With virtual boundary syntax included in Picture Header, a picture may have its own virtual boundaries. For example, a virtual boundary 130 may be a horizontal or vertical line defining a boundary between a clean area 110 and a dirty area 120.

One of the requirements for GDR includes an exact match at the recovery point. For exact match, the reconstructed recovery point pictures at the encoder and the decoder need to be the same (e.g., matched). For an exact match at the recovery point picture, coding units within a clean area cannot use any coding information (e.g., reconstructed pixels, code mode(s), motion vectors, reference indexes (refIdx), or the like) from a dirty area of the picture, because coding information in a dirty area may not be decoded correctly at the decoder.

As described above, VVC includes a plurality of coding tools. One such tool is a merge mode called History-Based Motion Vector Prediction (HMVP). With HMVP, a table (e.g., an HMVP table) is maintained having a predetermined size during the encoding and/or decoding process. For example, the predetermined size may be five (5), meaning references to the previous five coding units of a picture that were inter coded may be stored in the table. For example, the references may comprise motion information of the previous five coding units that were inter coded prior to a current coding unit of the picture. In this regard, motion information associated with the previous five inter coded coding units may be used as merge candidates for the current coding unit. As used herein, the term "current coding unit" may refer to a coding unit that is to undergo or currently is undergoing a coding process, such as an encoding process, decoding process, merge process, or the like. A current coding unit may be predictively coded both temporally and spatially. Many coding tools introduced by VVC use coding information from previously coded neighboring coding units to predictively code a current coding unit. In this regard, it may be likely that for a current coding unit in a clean area, the previously coded neighboring coding units may be associated with a dirty area of the picture. This may result in leaks and/or not an exact match at the recovery point. Thus, a reference VVC encoder cannot guarantee the exact match requirement for GDR applications. The VVC Specification has not specified constraints on coding tools for GDR applications.

The HMVP table may be updated after inter coding a non-subblock coding unit, with the associated motion information being added to the HMVP table following a first-in-first-out (FIFO) rule. In this manner, prior to adding the new associated motion information to the HMVP table, any identical entry motion information is removed from the HMVP table and all of the following references are moved forward. For a new coding tree unit (CTU) row, the table is reset.

The HMVP table comprises motion information for only previously inter coded coding units for a current coding unit. In this regard, coding units in intra mode are not part of the HMVP table. Additionally, it may be possible that one or more past inter coded coding units may have identical motion information, in which case such identical motion information will not be duplicated and only appear once in an HMVP table.

In some instances, an HMVP table for a current coding unit that is within a clean area may be associated with motion information of a coding unit that was inter coded within a dirty area. In other words, one or more coding unit references in an HMVP table may be associated with one or more coding units within a dirty area of a picture. In this regard, an exact match may not be achievable for GDR with HMVP. More specifically, for a current coding unit within a clean area of a picture, if any coding unit references in the HMVP table for the current coding unit are associated with previously inter coded coding units within a dirty area, there is no guarantee that HMVP tables at the encoder and decoder will be the same. In this regard, if the coding unit references in the HMVP table associated with previously inter coded coding units within a dirty area are included as merge candidates within a candidate list for a current coding unit, a mismatch between the encoder and the decoder may occur.

FIG. 2A illustrates an example picture in which a current CU 200 is within a clean area of a current CTU (e.g., to the left of the virtual boundary). In this example, if the five previously coded coding units (CU 13, CU 12, CU 11, CU 10, and CU 9) are all inter coded and have different motion information, the motion information of those five inter coded CUs will be included as references in the HMVP table for the current CU 200. However, among the five previously coded CUs, CU 10 and CU 9 are within the dirty area (e.g., to the right of the virtual boundary). Since CU 10 and CU 9 are within the dirty area, there is no guarantee that the motion information of CU 10 and CU 9 will be the same at the encoder and at the decoder. If the mismatched entries of HMVP tables are used as merge candidates for the current CU 200, this may result in encoding of the current CU at the encoder not being the same as decoding of the current CU at the decoder, resulting in a mismatch.

FIGS. 2B-2H illustrate additional examples of how several coding tools may involve coding information in dirty areas for coding units in clean areas.

As one example, all in-loop filters in VVC, including deblocking, SAO, and ALF, use pixels on both sides of a virtual boundary, thus implying pixels of coding units in a dirty area will contaminate the pixels of coding units within a clean area. Thus, all in-loop filters will have to be disabled at the virtual boundary in order to avoid the clean area being contaminated by the dirty area.

Luma Mapping with Chroma Scaling (LMCS) is a coding tool introduced by VVC. For LMCS, the chroma scaling factor for a coding unit may be calculated based upon reconstructed neighboring luma pixels. If a virtual boundary for a current picture is not aligned with the current coding tree unit (CTU), some of the reconstructed neighboring pixels in calculating the chroma scaling factor for a current coding unit in a clean area may be in a dirty area. FIG. 2B shows an example of a (vertical) virtual boundary 250 passing through CTU(s) of size 128×128, where the left side of the virtual boundary is a clean area and the area to the right of the virtual boundary is a dirty area. For a current coding unit 200 in the clean area, the above reconstructed neighboring luma pixels (96-127) used in calculating the current coding unit's chroma scaling factor are within a dirty area. Since LMCS cannot be turned on or off at the CTU level, LMCS has to be disabled for a current picture if the virtual boundary for the current picture is not CTU-aligned.

VVC includes a plurality of possible intra modes as well, with the majority of intra modes being angular intra modes. In this regard, for a current coding unit in a clean area, some angular intra modes may use reference samples from dirty areas to calculate predictions for the pixels of the current coding unit. FIG. 2C shows an example wherein an angular intra mode uses the reference samples 225 within a dirty area to calculate the predictions for the pixels of a coding unit 200 in the clean area.

For inter prediction modes, for a current coding unit, a prediction block is formed from one or more blocks in reference picture(s) pointed by the associated motion vectors (MVs). For a current coding unit in a clean area, the one or more blocks in reference picture(s) pointed by the MVs not only have to be in the clean areas of the reference pictures, but also may need to be a number of pixels away from the virtual boundary due to interpolation, which requires the use of neighboring pixels. If the neighboring pixels are within a dirty area, the clean area will be contaminated through interpolation operations of motion compensation. FIG. 2D shows an example wherein a block pointed by a fractional MV needs to be four (4) luma pixels away from the vertical virtual boundary.

VVC supports a number of new and refined inter prediction coding tools, including but not limited to General Inter AMVP, extended merge prediction, Merge Mode with MVD (MMVD), Symmetric MVD (SMVD) signaling, Affine AMVP, Affine Merge, Subblock-based Temporal Motion Vector Prediction (SbTMVP), Adaptive Motion Vector Resolution (AMVR), motion field storage ($1/16^{th}$ luma sample MV storage and 8×8 motion field compression), Bi-Prediction with coding unit-level weight (BCW), Bi-Directional Optical Flow (BDOF), Decoder Side Motion Vector Refinement (DMVR), Geometric Partitioning Mode (GPM), and Combined Inter and Intra Prediction (CIIP). The tools listed above each require use of at least part of a merge candidate list.

The merge candidate list for a current coding unit may be constructed by including five (5) types of candidates, in order of Spatial MVP candidates from spatial neighboring coding units, Temporal MVP (TMVP) candidates from temporal collocated coding units, History-Based MVP (HMVP) candidates from an HMVP table (e.g., a first-in first-out (FIFO) table), Pairwise Average MVP candidates, and Zero MV(s).

For Spatial MVP, the spatial merge candidates for a current coding unit are constructed from spatial neighboring coding units, as shown in FIG. 2E, wherein the spatial neighboring coding units of the current coding unit 200 include coding unit B 1, which is in a dirty area and may not be decoded correctly. If coding unit B1 is included in the merge candidate list, the encoder and decoder may have different merge candidate lists, resulting in a mismatch.

It is also possible that for a current coding unit, the prediction block pointed by the MVs of spatial neighboring coding units may be formed using pixels within a dirty area. In the example of FIG. 2E, the prediction block for coding unit A1 pointed by MV of A1 is in a clean area, but for the current coding unit 200 in the clean area, the prediction block pointed by MV of A1 may be within the dirty area (e.g., right of the virtual boundary). If coding unit A1 is signalled as the merge candidate for the current coding unit, leaks may also occur.

For TMVP, a temporal merge candidate for the current coding unit may be constructed from one of collocated coding units in a collocated reference picture, as shown in FIG. 2F. Shown in FIG. 2F is the current coding unit 200 along with collocated coding units C0 and C1, with coding unit C0 residing within a dirty area of the collocated reference picture. If C0 is included in the merge candidate list, the encoder and decoder may have different candidate lists, which will result in a mismatch between the encoder and the decoder.

Affine Merge is an inter coding mode wherein a coding unit is divided into subblocks of 4×4 and each 4×4 subblock may have its own unique MVs derived from two or three MVs of neighboring coding units, for example, mv0, mv1, and mv2 as shown in FIG. 2G.

Geometry Partitioning Mode (GPM) is a coding tool that extends from an earlier coding tool, Triangle Mode. In GPM, a coding unit is divided into two partitions, and each partition may have its own motion vector, as shown in FIG. 2H. The prediction blocks pointed by the two MVs are blended around the partition boundary. If, for a current coding unit in a clean area, any of the two prediction blocks use any pixels in the dirty area (e.g., through interpolation), a leak may occur.

Additionally, VVC supports coding tools for screen content coding (SCC) tools, e.g., intra block copy (IBC), Hash ME, Block Differential Pulse Coded Modulation (BDPCM). It is possible that for a current coding unit in a clean area, use of these screen content coding tools may involve coding information within a dirty area, which will cause leaks.

A method, apparatus, and computer program product are described herein for using HMVP for candidate lists (e.g., merge candidate lists and/or Advanced Motion Vector Prediction (AMVP) candidate lists) to avoid mismatches and/or leaks caused by HMVP. For a current coding unit in a clean area of a current CTU, references within an HMVP table may be classified as usable or unusable for a candidate list. Thus, unusable references may be prevented from being selected for including within a candidate list. Additionally, a method, computer program product, and apparatus are described herein for implementing efficient and effective coding mode selection for coding units within clean areas, such that an exact match for GDR applications may be achieved.

Example Apparatus

One example of an apparatus 300 that may be configured to carry out operations in accordance with an embodiment described herein is depicted in FIG. 3. As shown in FIG. 3, the apparatus includes, is associated with or is in communication with processing circuitry 32, a memory 34 and a communication interface 36. The processing circuitry 32 may be in communication with the memory via a bus for passing information among components of the apparatus. The memory may be non-transitory and may include, for example, one or more volatile and/or non-volatile memories. In other words, for example, the memory may be an electronic storage device (e.g., a computer readable storage medium) comprising gates configured to store data (e.g., bits) that may be retrievable by a machine (e.g., a computing device like the processing circuitry). The memory may be configured to store information, data, content, applications, instructions, or the like for enabling the apparatus to carry out various functions in accordance with an example embodiment of the present disclosure. For example, the memory could be configured to buffer input data for processing by the processing circuitry. Additionally, or alternatively, the memory could be configured to store instructions for execution by the processing circuitry.

The apparatus 100 may, in some embodiments, be embodied in various computing devices. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 32 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in to some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ one embodiment by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 36 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

According to some embodiments, the apparatus 300 may be configured in accordance with an architecture for providing for video encoding, decoding, and/or compression. In this regard, the apparatus 300 may be configured as a video coding device. For example, the apparatus 300 may be configured to code video in accordance with one or more video compression standards, such as, for example, the VVC Specification. While certain embodiments herein refer to operations associated with the VVC standard, it is to be appreciated that the processes discussed herein may be utilized for any video coding standard.

Example Processes for HMVP for GDR

In embodiments described herein, each coding unit of a picture may be associated with a unique index value, referred to herein as a coding unit (CU) index. In some embodiments, the CU index for a first coding unit in a picture may be set to zero (0), and CU indexes for the following coding units in the picture may then increment by one. In this regard, the CU index of the second coding unit in a picture may be set to one (1), the CU index of the third coding unit may be set to two (2), and so on. One skilled in the art may appreciate that other CU index numbering schemes may be implemented. In some embodiments, one or more of the CU indexes for coding units within a picture may be predefined (e.g., prior to accessing the picture for a coding process). In other embodiments, the apparatus 300 includes means, such as the processing circuitry 32, memory 34, and/or the like, configured to assign a CU index to one or more coding units of a picture.

Turning briefly to FIG. 6, a flowchart including operations that may be carried out by the apparatus 300 in some embodiments. At operation 601, the apparatus 300 includes means, such as the processing circuitry 32, memory 34, and/or the like, configured to obtain a current coding unit of a picture. For example, in some embodiments, the apparatus 300 may access the current coding unit in memory. As described above, the picture may include a plurality of coding units including the current coding unit (e.g., as shown in FIG. 2A). The current coding unit may be accessed by the apparatus 300 for purposes of carrying out a particular process and/or operation on the current coding unit, such as encoding, decoding, merging, or the like. In some embodiments, the picture may be a GDR picture. For example, the picture may be undergoing a gradual decoding refresh and comprise both a clean (refreshed) area and a dirty (non-refreshed) area.

The current coding unit may be within a clean area of the picture. The current coding unit may be included as part of a current coding tree unit (CTU) of a CTU row or block. The current coding unit in the clean area may be associated with a table. For example, the table may be a history-based motion vector prediction (HMVP) table configured in a first-in-first-out (FIFO) manner.

The HMVP table for the current coding unit may also be configured to comprise a predefined amount of entries. As one example, a maximum amount of entries for the HMVP table may be five (5). Each entry in the HMVP table may be associated with a respective inter coded coding unit previously coded prior to the current coding unit. In this regard, the entries may be references to particular coding units such that the entries comprise information about the particular coding units (e.g., motion information, CU index value, and/or the like).

At operation 602, the apparatus 300 includes means, such as the processing circuitry 32, memory 34, and/or the like, configured to access information associated with the current coding unit, the information comprising a predefined amount of coding unit references, each coding unit reference associated with a respective coding unit of the plurality of coding units that has previously undergone an inter coding operation. As described above, the information that is accessed may be an HMVP table for the current coding unit.

An example HMVP table structure is shown in FIG. 4A. As shown, each entry in the HMVP table is associated with a CU index of a previously inter coded coding unit, $CuIdx(m)$, $m=0,1,\ldots,max-1$, where $CuIdx(m) > CuIdx(n)$, for $m < n$ As used herein, a "dirty index" may refer to a data item such as a variable used by apparatus 300 to indicate the last coding unit that was inter coded within a dirty area of the picture. For example, a dirty index may be assigned a CU index of the last coding unit inter coded with the dirty area. For example purposes, the dirty index may be named lastDirtyInterCuIdx. In some embodiments, for a current CTU row, lastDirtyInterCuIdx may be set equal to the CU index of the first coding unit in the current CTU row, and then updated after a coding unit within a dirty area is inter coded, such that the updated lastDirtyInterCuIdx is set equal to the CU index of the inter coded coding unit within the dirty area.

The entries associated with $CuIdx(m)$, $m=0, 1, \ldots, max-1$ that are associated with CU indexes that are greater than a dirty index may be considered "good," or usable, HMVP candidates and other entries may be considered "bad," or unusable, HMVP candidates. Said differently, $CuIdx(m) > lastDirtyInterCuIdx$, $m=0, 1, \ldots, max-1$ may be considered to be usable candidates.

In this regard, unusable HMVP candidates may be associated with coding units that, if included in a candidate list (e.g., a merge candidate list or AMVP candidate list), may cause a resulting mismatch as described above.

For example, there may be three possible scenarios for an HMVP table. In the first scenario, all entries in the HMVP table may be usable (e.g., none of the coding units referred to in the HMVP table have been inter coded within a dirty area). In the second scenario, one or more of the first few entries may be usable and the remaining entries may be unusable (e.g., the remaining entries were inter coded within a dirty area). In the third scenario, all entries in the HMVP table may be unusable.

FIG. 4B depicts an example of the first scenario in which all entries in the HMVP table are considered "good," or usable, such that they may be included within a candidate list (e.g., if there is a spot available in the candidate list). In this regard, the CU index of the most recently inter coded CU within a dirty area is less (smaller) than $CuIdx(max-1)$, thus all the entries are considered usable HMVP candidates. In other words, all entries in the HMVP table of FIG. 4B are associated with CU indexes greater than the dirty index.

FIG. 4C depicts an example of the second scenario in which the first two entries of the HMVP table are considered "good," or usable, and the remaining entries are considered "bad," or unusable, due to being inter coded within a dirty area. As the HMVP table is configured in a FIFO manner, the "first" two entries are the most recent entries to the HMVP table. In the example of FIG. 4C, the dirty index may be associated with a CU index that is less (smaller) than CuIdx(1), but not less (smaller) than CuIdx(2). Thus, the entries CuIdx(0) and CuIdx(1) are marked as usable HMVP candidates, and CuIdx(2), CuIdx(3) and CuIdx(4) are marked as unusable HMVP candidates.

FIG. 4D depicts an example of the third scenario in which the CU index of the most recently inter coded coding unit within a dirty area (the dirty index) is equal to or not less (smaller) than CuIdx(0). Thus, all entries in the HMVP table shown in FIG. 4D are considered "bad," or unusable HMVP candidates.

In this regard, the motion information for the usable candidates of the HMVP tables shown in FIGS. 4A-D will remain the same at the encoder and decoder, but the unusable candidates, if included in a candidate list, may not necessarily remain the same at the encoder and decoder.

Turning back to FIG. 6, at operation 603, the apparatus 300 includes means, such as the processing circuitry 32, memory 34, and/or the like, configured to determine at least one candidate coding unit reference of the predefined amount of coding unit references based at least upon a comparison of an index value associated with the at least one candidate coding unit reference to a dirty index. As described above, the dirty index may comprise a CU index of a coding unit last to have undergone an inter coding operation while within a dirty area of the picture.

For example, the apparatus 300 may include means, such as the processing circuitry 32, memory 34, and/or the like, configured to compare each CU index referenced in the HMVP table for the current coding unit to the dirty index in order to determine one or more candidate coding units in a candidate list, such as a merge candidate list or an AMVP candidate list. As described above, the CU indexes that are greater than the dirty index may be considered usable HMVP candidates for inclusion in a candidate list.

At operation 604, the apparatus 300 includes means, such as the processing circuitry 32, memory 34, and/or the like, configured to assign at least one coding unit associated with the at least one candidate coding unit reference to a candidate list for selection in a coding process for the current coding unit.

A merge candidate list for a current coding unit (CU) may be constructed to include five types of candidates in order of Spatial Motion Vector Prediction (MVP) candidates from spatial neighboring CUs, Temporal Motion Vector Prediction (TMVP) candidates from temporal collocated CUs, History-Based Motion Vector Prediction (HMVP) candidates as described above, Pairwise Average MVP candidates, and zero (0) motion vectors (MVs). FIG. 5A depicts an example ordering of candidates for a merge candidate list.

As shown in FIG. 5A, if Spatial MVP and Temporal MVP candidates are usable and all of the HMVP candidates in the merge candidate list are "good," or usable candidates, any of the HMVP candidates may be selected from the merge candidate list.

Alternatively, as shown in FIG. 5B, if Spatial MVP and Temporal MVP candidates are usable, but only a portion of the HMVP candidates (e.g., the first few) are considered usable candidates and the remaining are unusable candidates, any of the usable candidates may be selected, e.g., by the apparatus 300. Candidates of the merge candidate list may be selected by the apparatus 300 for use in a coding process, such as an encoding, decoding, merge process, and/or the like. Further, if any of the HMVP candidates are marked as unusable for selection in the coding process (e.g., the candidates comprise an index value less than the dirty index), the apparatus 300 includes means, such as the processing circuitry 32, memory 34, and/or the like, configured to prevent any candidate coding units listed after unusable HMVP candidates in the candidate list from being selected for the coding process for the current coding unit. For example, the unusable HMVP candidates may be prevented from being selected, along with any Pairwise Average MVP candidates and Zero MV candidates, as shown in FIG. 5B.

As another example shown in FIG. 5C, if all HMVP candidates in the merge candidate list are considered unusable candidates, the apparatus 300 may prevent the unusable HMVP candidates along with any candidates listed after the unusable HMVP candidates from being selected (e.g., any Pairwise Average MVP candidates and Zero MV candidates) as shown in FIG. 5C.

To reduce implementation complexity as well as the processing resources needed for an encoder (e.g., such as apparatus 300), HMVP candidates in a merge candidate list and the candidates that follow the HVMP candidates in the merge candidate list may be prevented from being selected in an instance in which the current coding unit is within a CTU having both a clean area and a dirty area. Further, HMVP candidates in a merge candidate list and the candidates that follow the HVMP candidates in the merge candidate list may be prevented from being selected for current coding unit(s) in a clean area of a picture (e.g., a GDR picture or a recovering picture) within a GDR period in an instance in which the associated virtual boundary is not aligned with the CTU. Even further, HMVP candidates in a merge candidate list and the candidates that follow the HVMP candidates in the merge candidate list may be prevented from being selected for entire pictures (e.g., a GDR picture or a recovering picture) within a GDR period, if the associated virtual boundary is not CTU-aligned.

In some embodiments, HMVP candidates may be included in an AMVP candidate list. For example, for a current coding unit, for each of its reference picture indices, beginning with the oldest entry in an HMVP table, the entries may be checked in order (e.g., the oldest entry checked first), and if an entry is associated with the same reference picture index value, the associated motion information may be inserted to the AMVP candidate list. In some embodiments, up to two entries can be inserted to the candidate list after the TMVP candidate(s).

For a current CU in clean area of a current CTU of a current CTU row and for a possible reference picture index value (refIdx), if the current AMVP candidate list contains HMVP candidates, there are only two possible scenarios because for AMVP, the oldest entries of HMVP table are checked first.

In the first scenario, as shown in the example AMVP candidate list of FIG. 5D, all HMVP candidates in the AMVP candidate list may be usable candidates. In this regard, if Spatial MVP and Temporal MVP candidates are usable, an encoder (e.g., such as apparatus 300) can select any of the HMVP candidates in the AMVP candidate list.

In the second scenario, as shown in the example AVMP candidate list of FIG. 5E, all HMVP candidates in the AMVP candidate list may be unusable candidates. In this regard, an encoder (e.g., such as apparatus 300) may not select any of the HMVP candidates in the AMVP candidate list nor any of the candidates that follow the HMVP candidates in the list (e.g., Zero MVs candidates).

In some embodiments, to reduce implementation complexity as well as the processing resources needed for an encoder (e.g., such as apparatus 300), HMVP candidates in an AMVP candidate list and the candidates that follow the HVMP candidates in the AMVP candidate list may be prevented from being selected in an instance in which the current coding unit is within a CTU having both a clean area and a dirty area. Further, HMVP candidates in an AMVP candidate list and the candidates that follow the HVMP candidates in the AMVP candidate list may be prevented from being selected for current coding unit(s) in a clean area of a picture (e.g., a GDR picture or a recovering picture) within a GDR period in an instance in which the associated virtual boundary is not aligned with the CTU. Even further, HMVP candidates in an AMVP candidate list and the candidates that follow the HVMP candidates in the AMVP candidate list may be prevented from being selected for entire pictures (e.g., a GDR picture or a recovering picture) within a GDR period, if the associated virtual boundary is not CTU-aligned.

It is to be appreciated that similar concepts presented in the above embodiments may also apply to IBC merge candidate lists and IBC AMVP candidate lists, wherein entries of an IBC HMVP table may hold block vector information of the previously coded units in IBC mode.

Example Processes for Mode Selection for GDR

In VVC, a coding mode for a current coding unit may be selected from a plurality of possible coding modes based upon a coding cost function. For example, one possible coding cost function may be defined as $$\text{cost}=D+\lambda \times R$$

In this regard, R represents the resulting coding bits and D represents the associated coding distortion.

However, for a current coding unit within a clean area, the coding mode that is selected based on the coding cost function may use coding information from a dirty area, causing leaks.

As used herein, the term "valid coding mode" refers to a coding mode that does not use any coding information from a dirty area (and therefore does not result in any leaks).

As used herein, the term "invalid coding mode" refers to a coding mode that uses coding information from a dirty area and therefore may result in leaks. Further, to check the "validity" of a coding mode is to check whether the coding mode is valid or not. The term "validation of a coding mode" refers to a process of determining whether a coding mode is valid or invalid.

Embodiments herein describe a coding mode selection process for GDR applications in which coding mode selection for coding units within a clean area is performed based upon both coding cost and validity.

FIG. 7 shows operations directed to one embodiment for coding mode selection for GDR applications.

At operation 701, the apparatus 300 includes means, such as the processing circuitry 32, memory 34, and/or the like, configured to obtain a current coding unit of a picture. For example, the picture may comprise a plurality of coding units including the current coding unit. The current coding unit may be within a clean area of the picture. Obtaining the current coding unit may be similar to processes described above with reference to operation 601 of FIG. 6.

At operation 702, the apparatus 300 includes means, such as the processing circuitry 32, memory 34, and/or the like, configured to determine, based at least on the current coding unit, a validity status for each of a plurality of coding modes. The validity status may comprise one of a valid status or an invalid status. In this regard, the apparatus 300 (e.g., an encoder) may check the validity of each possible coding mode for the current coding unit. If a coding mode is determined to be invalid, the apparatus 300 may discard and/or ignore the invalid coding mode. Otherwise, if the coding mode is determined to be valid, the encoder may perform a determination of a coding cost for the valid coding mode.

In this regard, at operation 703, the apparatus 300 includes means, such as the processing circuitry 32, memory 34, and/or the like, configured to determine, for each coding mode of the plurality of coding modes associated with a valid status, a coding cost for the respective coding mode. For example, the coding cost may be determined using a cost function, such as cost=D+λ×R, as described above.

The coding costs of the coding modes having a valid status may then be compared according to their coding costs, and the valid coding mode having the lowest coding cost may be selected as the coding mode to be applied to the current coding unit. In this regard, at operation 704, the apparatus 300 includes means, such as the processing circuitry 32, memory 34, and/or the like, configured to assign a selected coding mode to the current coding unit, wherein the selected coding mode is determined based on a comparison of coding costs for the each coding mode of the plurality of coding modes associated with a valid status.

For example, for intra mode, the apparatus 300 may check the validity of each intra coding mode. The apparatus 300 may ignore any invalid intra coding modes (e.g., intra coding modes that use reference samples from a dirty area), such that the encoder calculates coding costs for valid intra coding modes only.

As another example, for general inter mode, the apparatus 300 may check the validity of each inter coding mode and ignore invalid inter coding modes (inter coding modes with MVP candidates associated with coding units within a dirty area). The apparatus 300 may also limit the motion search ranges of reference pictures inside clean areas and away from a respective virtual boundary by a number of pixels, thus preventing the prediction block pointed by the selected MV(s) from being associated with any pixels in a dirty area. The apparatus 300 may then determine the coding costs for the inter coding modes with valid MVP and MVs.

As another example, for merge mode, the apparatus 300 may check the validity of each merge candidate, and ignore any invalid merge candidates in the merge candidate list. Additionally, if an invalid candidate can potentially affect the merge candidates that follow the invalid candidate in a merge candidate list, the apparatus 300 may ignore those affected merge candidates as well. The apparatus 300 may then determine coding costs for only the valid merge candidates.

Similarly, for other modes (e.g., Affine Merge, SbTMVP, GPM, IBC, Hash ME, etc.), the apparatus may perform validity checks on all possible coding modes, and calculate coding costs for the valid coding modes only.

Thus, the operations of FIG. 7 performs validation for all coding modes first, then calculates coding costs for the valid coding modes only.

FIG. 8 shows operations directed to another embodiment for coding mode selection for GDR applications.

At operation 801, the apparatus 300 includes means, such as the processing circuitry 32, memory 34, and/or the like, configured to obtain a current coding unit of a picture. For example, the picture may comprise a plurality of coding units including the current coding unit. The current coding unit may be within a clean area of the picture. Obtaining the current coding unit may be similar to processes described above with reference to operation 601 of FIG. 6.

At operation 802, the apparatus 300 includes means, such as the processing circuitry 32, memory 34, and/or the like, configured to, based at least on the current coding unit, determine a coding cost for each of a plurality of coding modes. In this regard, a coding cost is determined for all possible coding modes.

At operation 803, the apparatus 300 includes means, such as the processing circuitry 32, memory 34, and/or the like, configured to determine a selected coding mode of the plurality of coding modes based on the selected coding mode having a lowest coding cost while also having a valid status. In this regard, the validity of a coding mode having the lowest coding cost may be determined first. If invalid, the apparatus 300 may check the validity of a coding mode having the second lowest coding cost. In this regard, the coding modes may be checked for a valid status based on their coding costs beginning with the lowest coding cost. This process may continue until a valid coding mode is found. Once a coding mode is determined to be valid, that coding mode may be selected to be assigned to the current coding unit.

At operation 804, the apparatus 300 includes means, such as the processing circuitry 32, memory 34, and/or the like, configured to assign the selected coding mode to the current coding unit.

For example, for intra mode, the apparatus 300 may calculate the coding costs for all possible intra coding modes.

For regular inter mode, the apparatus may determine coding costs for inter coding modes with possible MVP candidates and possible MVs in the motion search ranges of reference pictures. The apparatus 300 may ignore inter coding modes with MVP candidates associated with the dirty areas and limit the motion search ranges inside clean areas of reference pictures.

Similarly for each other mode (e.g., Affine Merge, SbTMVP, GPM, IBC, Hash ME, etc.), coding costs may be determined for all possible coding modes. The apparatus 300 may perform validation (e.g. determine a validity status) for the coding modes according to their coding costs (starting from the coding mode with the lowest coding cost). The first valid coding mode found during this validity check process may be assigned to the current coding unit.

Thus, the operations of FIG. 8 determine coding costs for all possible coding modes first, and then performs a validity check one-by-one, starting with the coding mode having the lowest coding cost, and stopping once a valid coding mode is found. It may be very likely that this validity check process may only need to be performed for only a few coding modes, which significantly reduces the cycles of the validity check process.

FIG. 9 shows operations directed to another embodiment for coding mode selection for GDR applications.

In an embodiment of the method shown in FIG. 9, possible coding modes may be divided into subgroups. This division may be predefined, such that each coding mode is predefined to belong to a respective subgroup.

For example, Table A below depicts several example subgroups.

TABLE A

Subgroup: Intra mode
Subgroup: Inter mode with ME (BCW, AMVR)
General inter AMVP (MVP + MVD)

TABLE A-continued

Affine AMVP (Affine MVP + MVD)
Symmetric MVD (SMVD) signalling (MVP + single MVD for bi-directional prediction)
Subgroup: Merge Mode
Extended merge prediction
Merge mode with MVD (MMVD)
Combined inter and intra prediction (CIIP)
Bi-directional optical flow (BDOF)
Decoder side motion vector refinement (DMVR)
Subgroup: Subblock-Based Merge Mode
Affine merge mode
Subblock-based temporal motion vector prediction (SbTMVP)
Subgroup: Screen Content Coding (SCC)
Intra block copy (IBC) AMVP
Inter block copy (IBC) merge
Hash ME
BDPCM
Subgroup: Geometric Partitioning Mode (GPM)

At operation 901, the apparatus 300 includes means, such as the processing circuitry 32, memory 34, and/or the like, configured to obtain a current coding unit of a picture. For example, the picture may comprise a plurality of coding units including the current coding unit. The current coding unit may be within a clean area of the picture. Obtaining the current coding unit may be similar to processes described above with reference to operation 601 of FIG. 6.

At operation 902, the apparatus 300 includes means, such as the processing circuitry 32, memory 34, and/or the like, configured to, based at least on the current coding unit, determine a validity status for each coding mode of a plurality of coding modes, wherein the validity status comprises one a valid status or an invalid status, and wherein each coding mode of the plurality of coding modes is associated with a respective coding mode subgroup.

At operation 903, the apparatus 300 includes means, such as the processing circuitry 32, memory 34, and/or the like, configured to determine, for each coding mode of the plurality of coding modes associated with a valid status, a coding cost for the respective coding mode. In this regard, coding modes having an invalid status may be ignored and not have a coding cost determined for them.

At operation 904, the apparatus 300 includes means, such as the processing circuitry 32, memory 34, and/or the like, configured to determine, for each coding mode subgroup, a respective candidate coding mode having a lowest coding cost of the coding costs of the coding modes associated with the coding mode subgroup.

In this regard, for each subgroup of coding modes, the apparatus 300 may perform determination of a validity status for each coding mode first, and then calculate the coding costs for the valid coding modes only, and select the coding mode with the lowest coding cost among the valid coding modes as the candidate coding mode for the respective subgroup. The apparatus 300 may then select a coding mode from among the candidate coding modes having the lowest coding cost. In this regard, at operation 905, the apparatus 300 includes means, such as the processing circuitry 32, memory 34, and/or the like, configured to assign a selected coding mode to the current coding unit, wherein the selected coding mode is determined based on a comparison of coding costs for each of the candidate coding modes.

For example, for a current coding unit in a clean area, for intra mode, the apparatus 300 determines a validity status for each intra coding mode, and ignores any invalid intra coding modes that use reference samples from a dirty area. The apparatus then determines and compares coding costs for the valid intra coding modes only and selects the valid coding mode having the lowest coding cost as the candidate coding mode (e.g., for the intra mode subgroup).

For inter mode with ME, the apparatus 300 may check validity and ignore inter coding modes with MVP candidates associated with coding units in dirty areas, and also limit the motion search ranges of reference pictures inside the clean areas and away from a respective virtual boundary by a number of pixels, preventing the prediction block pointed by the selected MVs from being associated with any pixels in a dirty area. The apparatus 300 may then calculate coding costs for inter coding mode with valid MVP and MVs and select the one with the lowest coding cost as the candidate coding mode for an inter coding mode subgroup.

For merge mode, the apparatus 300 may determine a validity status for each merge candidate, and ignore any invalid merge candidates in the merge candidate list. Additionally, if an invalid candidate can potentially affect the following merge candidates in the merge candidate list, the apparatus 300 may ignore those affected merge candidates as well. The apparatus 300 may then determine coding costs for valid merge candidates only and select the valid merge candidate having the lowest coding cost as a candidate coding mode for a merge mode subgroup.

For each other subgroup (e.g., Subblock-based Merge Mode, SCC, GPM, etc.), the apparatus 300 may determine a validity status for each possible coding mode and ignore any invalid coding modes that use reference samples from a dirty area. The apparatus 300 may then determine and compare coding costs for the valid coding modes only and select the valid coding mode having the lowest coding cost as the candidate coding mode (e.g., for the respective subgroup).

The apparatus 300 may then select the coding mode to be assigned to the current coding unit from among the candidate coding modes of the subgroups (e.g., the candidate coding mode having the lowest coding cost). Thus the method shown in FIG. 9 determines a best valid coding mode with the least coding cost per subgroup first, and then selects the assigned coding mode among those best valid coding modes of subgroups according to their coding costs.

FIG. 10 shows operations directed to another embodiment for coding mode selection for GDR applications.

In an embodiment of the method shown in FIG. 10, possible coding modes may be divided into subgroups, e.g., as described above. In the method of FIG. 10, for each subgroup of coding modes, the apparatus 300 may calculate coding costs for all possible coding modes first, and then perform validity status determination for the coding modes according to their coding costs and select the first valid coding mode found as a candidate coding mode for the respective subgroup.

The apparatus 300 may then select a coding mode from among the candidate coding modes of subgroups according to their coding costs.

At operation 1001, the apparatus 300 includes means, such as the processing circuitry 32, memory 34, and/or the like, configured to obtain a current coding unit of a picture. For example, the picture may comprise a plurality of coding units including the current coding unit. The current coding unit may be within a clean area of the picture. Obtaining the current coding unit may be similar to processes described above with reference to operation 601 of FIG. 6.

At operation 1002, the apparatus 300 includes means, such as the processing circuitry 32, memory 34, and/or the like, configured to, based at least on the current coding unit, determine a coding cost for each coding mode of a plurality of coding modes, wherein each coding mode of the plurality of coding modes is associated with a respective coding mode subgroup.

At operation 1003, the apparatus 300 includes means, such as the processing circuitry 32, memory 34, and/or the like, configured to determine, for each coding mode subgroup, a respective candidate coding mode having a lowest coding cost of the coding costs of the coding modes associated with the coding mode subgroup while also having a valid status.

At operation 1004, the apparatus 300 includes means, such as the processing circuitry 32, memory 34, and/or the like, configured to assign a selected coding mode to the current coding unit, wherein the selected coding mode is determined based on a comparison of coding costs for each of the candidate coding modes.

Thus, the method of FIG. 10 determines coding costs and performs validity status determination for the coding modes for one subgroup at a time, which may reduce memory requirements for holding the information on the coding costs of the coding modes.

FIG. 11 shows operations directed to another embodiment for coding mode selection for GDR applications.

In an embodiment of the method shown in FIG. 11, possible coding modes may be divided into subgroups, e.g., as described above. In an embodiment of the method shown in FIG. 11, for each subgroup, the apparatus 300 may determine coding costs for all possible coding modes and then select the coding mode with the lowest coding cost as the candidate coding mode for the subgroup. Then, the apparatus determines a validity status for the candidate coding modes of the subgroups, and selects the valid coding mode with the lowest coding cost as the final coding mode.

At operation 1101, the apparatus 300 includes means, such as the processing circuitry 32, memory 34, and/or the like, configured to obtain a current coding unit of a picture. For example, the picture may comprise a plurality of coding units including the current coding unit. The current coding unit may be within a clean area of the picture. Obtaining the current coding unit may be similar to processes described above with reference to operation 601 of FIG. 6.

At operation 1102, the apparatus 300 includes means, such as the processing circuitry 32, memory 34, and/or the like, configured to, based at least on the current coding unit, determine a coding cost for each coding mode of a plurality of coding modes, wherein each coding mode of the plurality of coding modes is associated with a respective coding mode subgroup.

At operation 1103, the apparatus 300 includes means, such as the processing circuitry 32, memory 34, and/or the like, configured to determine, for each coding mode subgroup, a respective candidate coding mode having a lowest coding cost of the coding costs of the coding modes associated with the coding mode subgroup.

At operation 1104, the apparatus 300 includes means, such as the processing circuitry 32, memory 34, and/or the like, configured to determine a validity status for each candidate coding mode, wherein the validity status comprises one of a valid status or an invalid status.

At operation 1105, the apparatus 300 includes means, such as the processing circuitry 32, memory 34, and/or the like, configured to assign a selected coding mode to the current coding unit, wherein the selected coding mode is selected based on having a lowest coding cost of the coding costs associated with the candidate coding modes determined to have a valid status.

In this regard, for a current coding unit in a clean area, for each subgroup the apparatus may determine coding costs for all possible coding modes and determine a candidate coding mode from each subgroup having the lowest coding cost of the respective subgroup. The apparatus then determines a validity status for only the candidate coding modes. The apparatus may determine a validity status for the candidate coding mode having the lowest coding cost of the candidate coding modes first, and if valid, select that coding mode as the coding mode to be assigned to the current coding unit. If invalid, the apparatus may determine the validity status of a second candidate coding mode having the next lowest coding cost. This process may continue until a valid candidate coding mode is determined. If none of the best coding modes of subgroups is valid, the apparatus may select a default valid coding mode (e.g. DC) as the assigned coding mode. Thus, the method of FIG. 11 performs validity status determination for the candidate coding modes of subgroups only, which significantly reduces the process cycles for validity status determination process.

FIG. 12 shows operations directed to another embodiment for coding mode selection for GDR applications. In an example embodiment of the method of FIG. 12, validity status determination may only be determined on a candidate coding mode having a lowest coding cost. In this regard, the apparatus 300 may determine a coding cost for all possible coding modes and select the coding mode with the lowest coding cost. Then, the apparatus may determine a validity status of the selected coding mode. If valid, the selected coding mode is assigned to the current coding unit. If invalid, the apparatus 300 may select a default valid coding mode as the assigned coding mode.

At operation 1201, the apparatus 300 includes means, such as the processing circuitry 32, memory 34, and/or the like, configured to obtain a current coding unit of a picture. For example, the picture may comprise a plurality of coding units including the current coding unit. The current coding unit may be within a clean area of the picture. Obtaining the current coding unit may be similar to processes described above with reference to operation 601 of FIG. 6.

At operation 1202, the apparatus 300 includes means, such as the processing circuitry 32, memory 34, and/or the like, configured to, based at least on the current coding unit, determine a coding cost for each of a plurality of coding modes.

At operation 1203, the apparatus 300 includes means, such as the processing circuitry 32, memory 34, and/or the like, configured to, determine a selected coding mode based on the selected coding mode having the lowest coding cost of the coding costs determined for the plurality of coding modes.

At operation 1204, the apparatus 300 includes means, such as the processing circuitry 32, memory 34, and/or the like, configured to determine a validity status for the selected coding mode, wherein the validity status comprises one a valid status or an invalid status. At operation 1205, the apparatus 300 includes means, such as the processing circuitry 32, memory 34, and/or the like, configured to, in accordance with a determination of a valid status for the selected coding mode, assign the selected coding mode to the current coding unit. If the selected coding mode is invalid, the apparatus may select a default valid coding mode (e.g., DC) as the assigned coding mode. Thus, the method of FIG. 12 performs a validity status determination for the selected coding modes only, which significantly reduces the process cycles for the validity status determination process.

As described above, a method, apparatus, and computer program product are disclosed for efficient management of history-based motion vector prediction processes and coding mode selection for GDR. Benefits of this design include reduced transmission time of pictures by way of a reduction in necessary processing resources and decreased encoder to decoder delay.

FIGS. 6-12 illustrate flowcharts depicting methods according to a certain example embodiment. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present disclosure and executed by a processor 32. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising: at least one processor; and at least one memory including computer program code, the at least one memory and the computer program code configured to, with the at least one processor, cause the apparatus to:
   obtain a current coding unit of a picture, the picture comprising a plurality of coding units including the current coding unit;
   access information associated with the current coding unit, wherein the information comprises a History-Based Motion Vector Prediction (HMVP) table, wherein the HMVP table comprises an amount of coding unit references, each coding unit reference associated with a respective coding unit of the plurality of coding units that has previously undergone an inter coding operation;
   determine at least one candidate coding unit reference of the predefined amount of coding unit references based at least upon a comparison of an index value associated with the at least one candidate coding unit reference to a dirty index, the dirty index comprising an index value of a coding unit of the plurality of coding units last to have undergone an inter coding operation while within a dirty area of the picture;
   assign at least one coding unit associated with the at least one candidate coding unit reference to a candidate list for selection in a coding process for the current coding unit; and
   prevent a candidate coding unit in the candidate list from being selected in the coding process for the current coding unit: (i) in an instance in which the current coding unit is within a coding tree unit having both a clean area and a dirty area, or (ii) for the picture in its entirety or the current coding unit in a clean area of the picture in an instance in which an associated virtual boundary is not aligned with the coding tree unit.

2. The apparatus according to claim 1, wherein the at least one memory and the computer program code are configured to, with the at least one processor, cause the apparatus to prevent a candidate coding unit in the candidate list from being selected in the coding process for the current coding unit by also preventing any candidate coding units listed after the candidate coding unit in the candidate list from being selected for the coding process for the current coding unit: (i) in the instance in which the current coding unit is within the coding tree unit having both a clean area and a dirty area, or (ii) for the picture in its entirety or the current coding unit in a clean area of the picture in an instance in which the associated virtual boundary is not aligned with the coding tree unit.

3. The apparatus according to claim 1, wherein the at least one memory and the computer program code are configured to, with the at least one processor, cause the apparatus to prevent a candidate coding unit in the candidate list from being selected in the coding process for the current coding unit for the picture in its entirety or the current coding unit in a clean area of the picture in an instance in which an associated virtual boundary is not aligned with the coding tree unit by preventing the candidate coding unit in the candidate list from being selected in the coding process for the current coding unit for the picture within a gradual decoding refresh (GDR) period or the current coding unit in a clean area of the picture within the GDR period in the instance in which the associated virtual boundary is not aligned with the coding tree unit.

4. The apparatus of claim 1, wherein the picture comprises a gradual decoding refresh picture.

5. The apparatus according to claim 1, wherein the candidate list comprises a merge candidate list, and wherein the at least one memory and the computer program code are further configured to, with the at least one processor, cause the apparatus to:
   assign the at least one coding unit to the merge candidate list such that the at least one coding unit is listed after one or more Temporal Motion Vector Prediction (TMVP) candidate coding units.

6. The apparatus according to claim 1, wherein the at least one memory and the computer program code are further configured to, with the at least one processor, cause the apparatus to:
   in an instance in which one or more candidate coding unit references of the predefined amount of coding unit references comprises an index value less than the dirty index:
   prevent any candidate coding units listed after the at least one candidate coding unit in the candidate list from being selected for the coding process for the current coding unit.

7. The apparatus according to claim 1, wherein the candidate list comprises an Advanced Motion Vector Prediction (AMVP) candidate list, and wherein the at least one memory and the computer program code are further configured to, with the at least one processor, cause the apparatus to:
   assign the at least one coding unit to the AMVP candidate list such that the at least one coding unit is listed after one or more Temporal Motion Vector Prediction (TMVP) candidate coding units.

8. The apparatus according to claim 1, wherein the candidate list comprises one of a merge candidate list or an Advanced Motion Vector Prediction (AMVP) candidate list.

9. A method comprising:
   obtaining a current coding unit of a picture, the picture comprising a plurality of coding units including the current coding unit;
   accessing information associated with the current coding unit, wherein the information comprises a History-Based Motion Vector Prediction (HMVP) table, wherein the HMVP table comprises an amount of coding unit references, each coding unit reference associated with a respective coding unit of the plurality of coding units that has previously undergone an inter coding operation;
   determining at least one candidate coding unit reference of the predefined amount of coding unit references based at least upon a comparison of an index value associated with the at least one candidate coding unit reference to a dirty index, the dirty index comprising an index value of a coding unit of the plurality of coding units last to have undergone an inter coding operation while within a dirty area of the picture;
   assigning at least one coding unit associated with the at least one candidate coding unit reference to a candidate list for selection in a coding process for the current coding unit; and
   preventing a candidate coding unit in the candidate list from being selected in the coding process for the current coding unit: (i) in an instance in which the current coding unit is within a coding tree unit having both a clean area and a dirty area, or (ii) for the picture in its entirety or the current coding unit in a clean area of the picture in an instance in which an associated virtual boundary is not aligned with the coding tree unit.

10. The method according to claim 9, wherein preventing a candidate coding unit in the candidate list from being selected in the coding process for the current coding unit comprises also preventing any candidate coding units listed after the candidate coding unit in the candidate list from being selected for the coding process for the current coding unit: (i) in the instance in which the current coding unit is within the coding tree unit having both a clean area and a dirty area, or (ii) for the picture in its entirety or the current coding unit in a clean area of the picture in an instance in which the associated virtual boundary is not aligned with the coding tree unit.

11. The method according to claim 9, wherein preventing a candidate coding unit in the candidate list from being selected in the coding process for the current coding unit for the picture in its entirety or the current coding unit in a clean area of the picture in an instance in which an associated virtual boundary is not aligned with the coding tree unit comprises preventing the candidate coding unit in the candidate list from being selected in the coding process for the current coding unit for the picture within a gradual decoding refresh (GDR) period or the current coding unit in a clean area of the picture within the GDR period in the instance in which the associated virtual boundary is not aligned with the coding tree unit.

12. The method of claim 9, wherein the picture comprises a gradual decoding refresh picture.

13. The method according to claim 9, wherein the candidate list comprises a merge candidate list, and wherein the method further comprises:
assigning the at least one coding unit to the merge candidate list such that the at least one coding unit is listed after one or more Temporal Motion Vector Prediction (TMVP) candidate coding units.

14. The method according to claim 9, wherein the method further comprises:
in an instance in which one or more candidate coding unit references of the predefined amount of coding unit references comprises an index value less than the dirty index:
preventing any candidate coding units listed after the at least one candidate coding unit in the candidate list from being selected for the coding process for the current coding unit.

15. The method according to claim 9, wherein the candidate list comprises an Advanced Motion Vector Prediction (AMVP) candidate list, and wherein the method further comprises:
assigning the at least one coding unit to the AMVP candidate list such that the at least one coding unit is listed after one or more Temporal Motion Vector Prediction (TMVP) candidate coding units.

16. The method according to claim 9, wherein the candidate list comprises one of a merge candidate list or an Advanced Motion Vector Prediction (AMVP) candidate list.

17. A computer program product comprising a non-transitory computer readable storage medium having program code portions stored thereon, the program code portions configured, upon execution, to:
obtain a current coding unit of a picture, the picture comprising a plurality of coding units including the current coding unit;
access information associated with the current coding unit, wherein the information comprises a History-Based Motion Vector Prediction (HMVP) table, wherein the HMVP table comprises an amount of coding unit references, each coding unit reference associated with a respective coding unit of the plurality of coding units that has previously undergone an inter coding operation;
determine at least one candidate coding unit reference of the predefined amount of coding unit references based at least upon a comparison of an index value associated with the at least one candidate coding unit reference to a dirty index, the dirty index comprising an index value of a coding unit of the plurality of coding units last to have undergone an inter coding operation while within a dirty area of the picture;
assign at least one coding unit associated with the at least one candidate coding unit reference to a candidate list for selection in a coding process for the current coding unit; and
prevent a candidate coding unit in the candidate list from being selected in the coding process for the current coding unit: (i) in an instance in which the current coding unit is within a coding tree unit having both a clean area and a dirty area, or (ii) for the picture in its entirety or the current coding unit in a clean area of the picture in an instance in which an associated virtual boundary is not aligned with the coding tree unit.

18. The computer program product according to claim 17, wherein the program code portions configured to prevent a candidate coding unit in the candidate list from being selected in the coding process for the current coding unit comprise program code portions configured to also prevent any candidate coding units listed after the candidate coding unit in the candidate list from being selected for the coding process for the current coding unit: (i) in the instance in which the current coding unit is within the coding tree unit having both a clean area and a dirty area, or (ii) for the picture in its entirety or the current coding unit in a clean area of the picture in an instance in which the associated virtual boundary is not aligned with the coding tree unit.

19. The computer program product according to claim 17, wherein the program code portions configured to prevent a candidate coding unit in the candidate list from being selected in the coding process for the current coding unit for the picture in its entirety or the current coding unit in a clean area of the picture in an instance in which an associated virtual boundary is not aligned with the coding tree unit comprise program code portions configured to prevent the candidate coding unit in the candidate list from being selected in the coding process for the current coding unit for the picture within a gradual decoding refresh (GDR) period or the current coding unit in a clean area of the picture within the GDR period in the instance in which the associated virtual boundary is not aligned with the coding tree unit.

20. The computer program product according to claim 17, wherein the candidate list comprises one of a merge candidate list or an Advanced Motion Vector Prediction (AMVP) candidate list.

* * * * *